F. M. CARROLL.
PRINTING MECHANISM FOR CASH REGISTERS.
APPLICATION FILED AUG. 13, 1915.

1,338,903. Patented May 4, 1920.
13 SHEETS—SHEET 1.

Inventor
FRED M. CARROLL
Attorneys

F. M. CARROLL.
PRINTING MECHANISM FOR CASH REGISTERS.
APPLICATION FILED AUG. 13, 1915.
1,338,903.
Patented May 4, 1920.
13 SHEETS—SHEET 2.
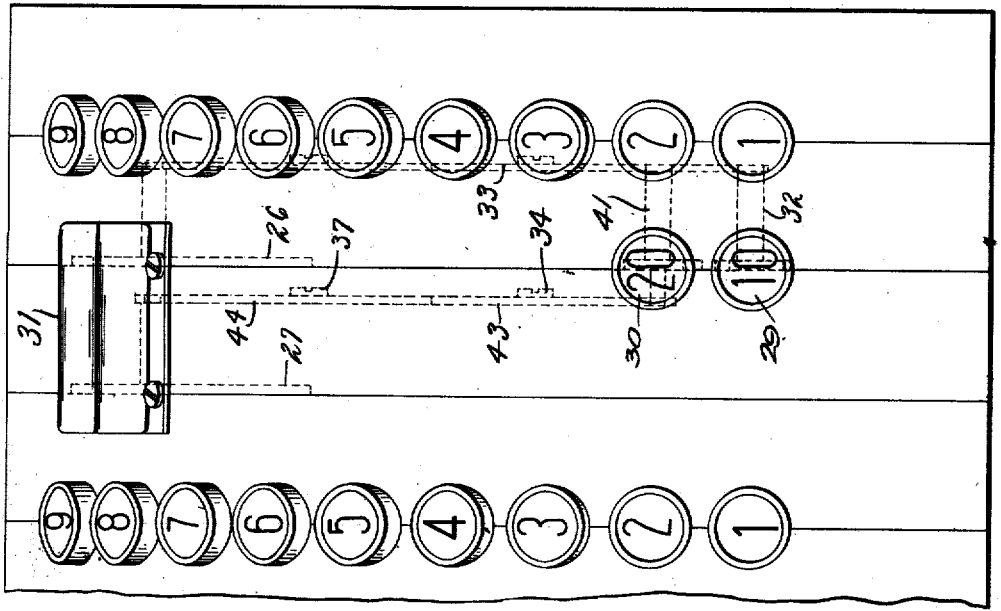
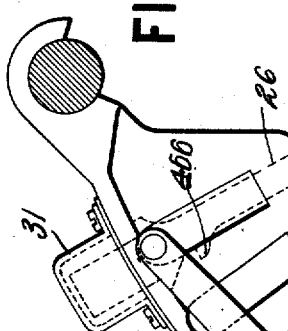
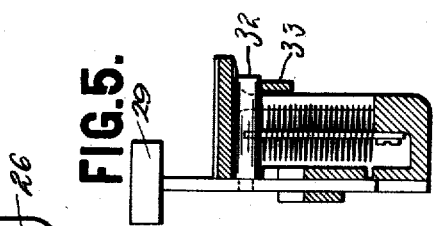
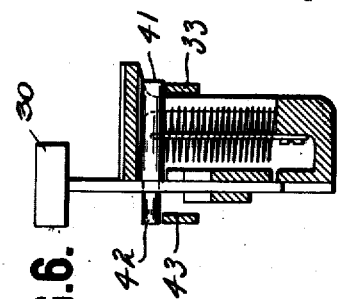
Inventor
FRED M. CARROLL F. M. CARROLL.
PRINTING MECHANISM FOR CASH REGISTERS.
APPLICATION FILED AUG. 13, 1915.
1,338,903.
Patented May 4, 1920.
13 SHEETS—SHEET 3.
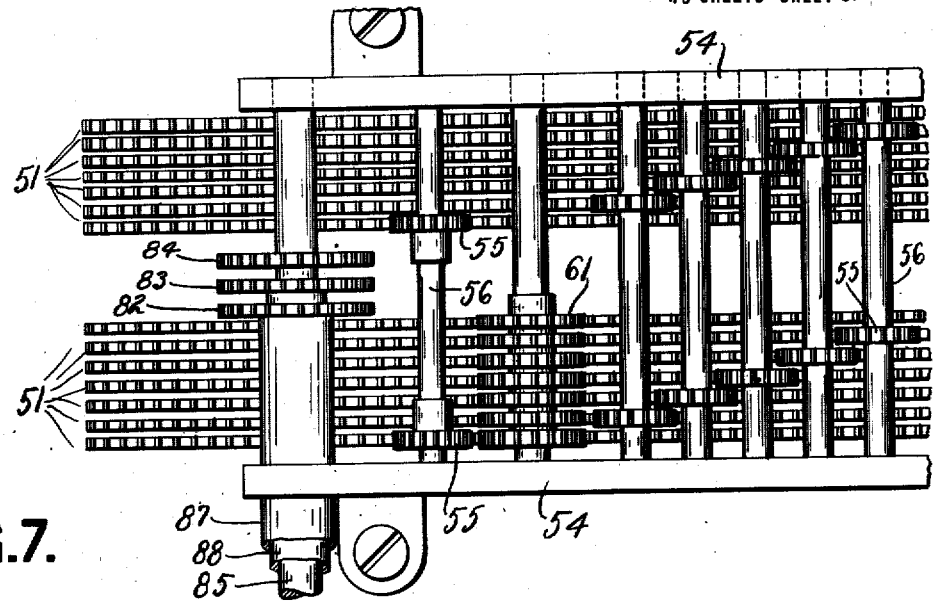
FIG. 7.
FIG. 9.
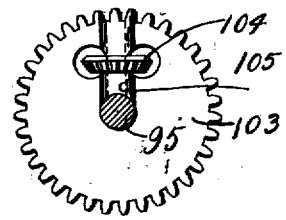
FIG. 8.
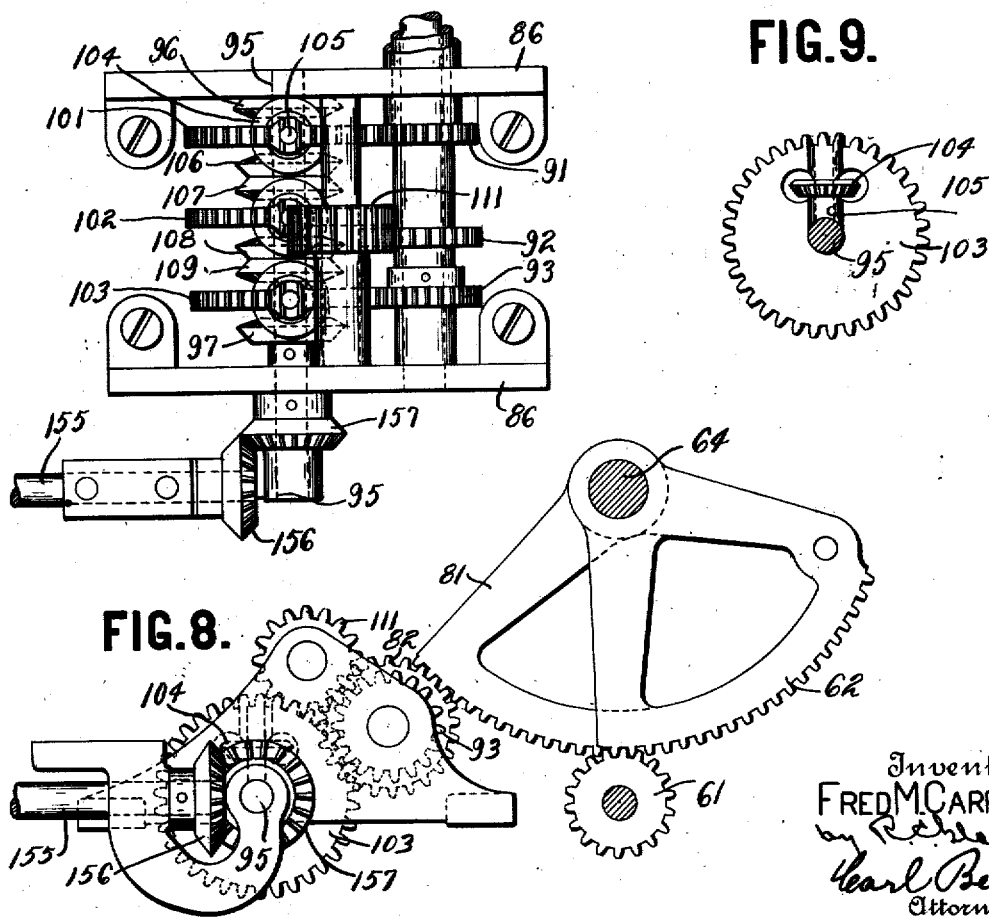
Inventor
FRED M. CARROLL
by R. ...
Carl Benet
Attorneys F. M. CARROLL.
PRINTING MECHANISM FOR CASH REGISTERS.
APPLICATION FILED AUG. 13, 1915.

1,338,903.

Patented May 4, 1920.
13 SHEETS—SHEET 4.

Inventor
FRED M. CARROLL
by R. C. Sears
Pearl Beust
Attorneys

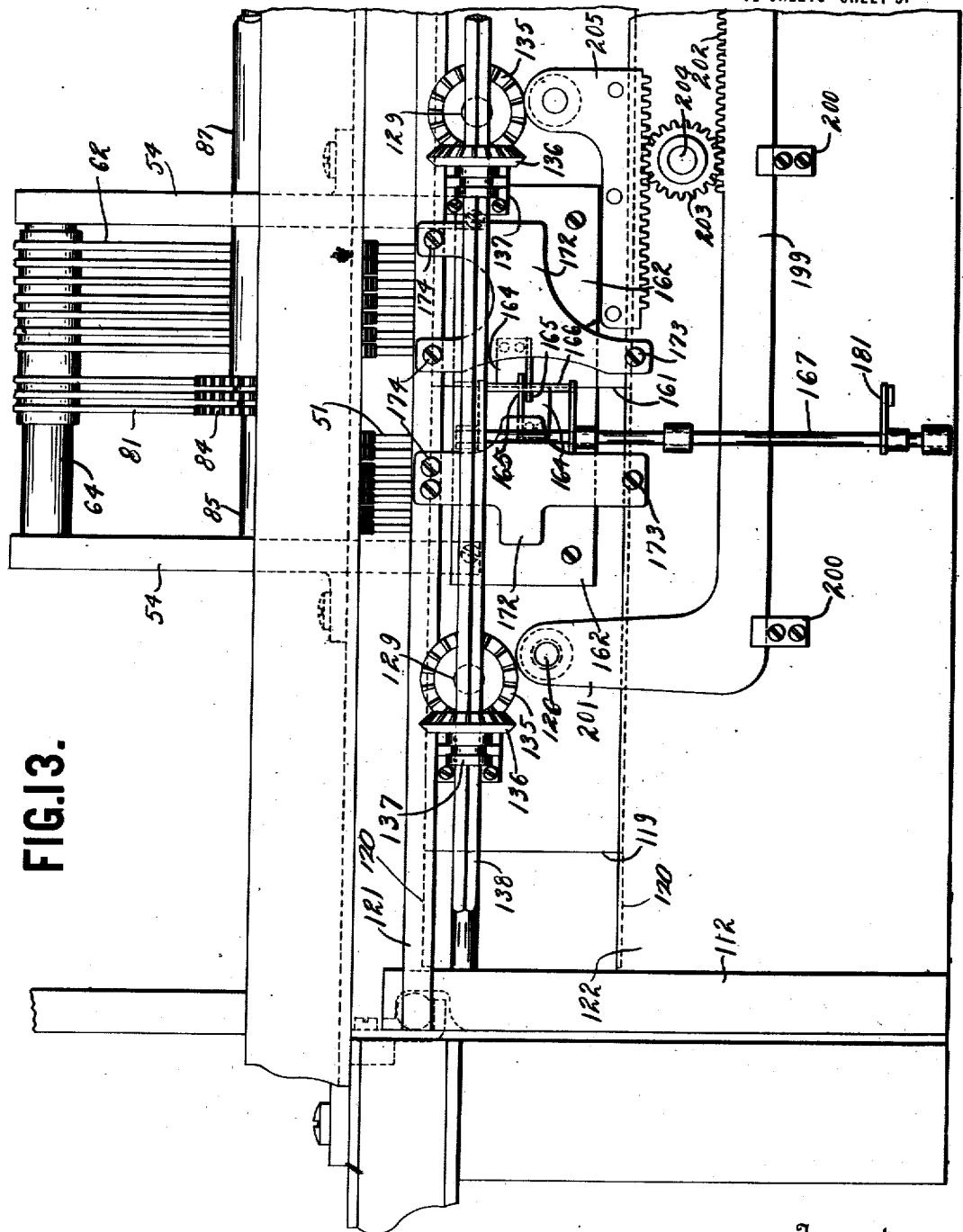

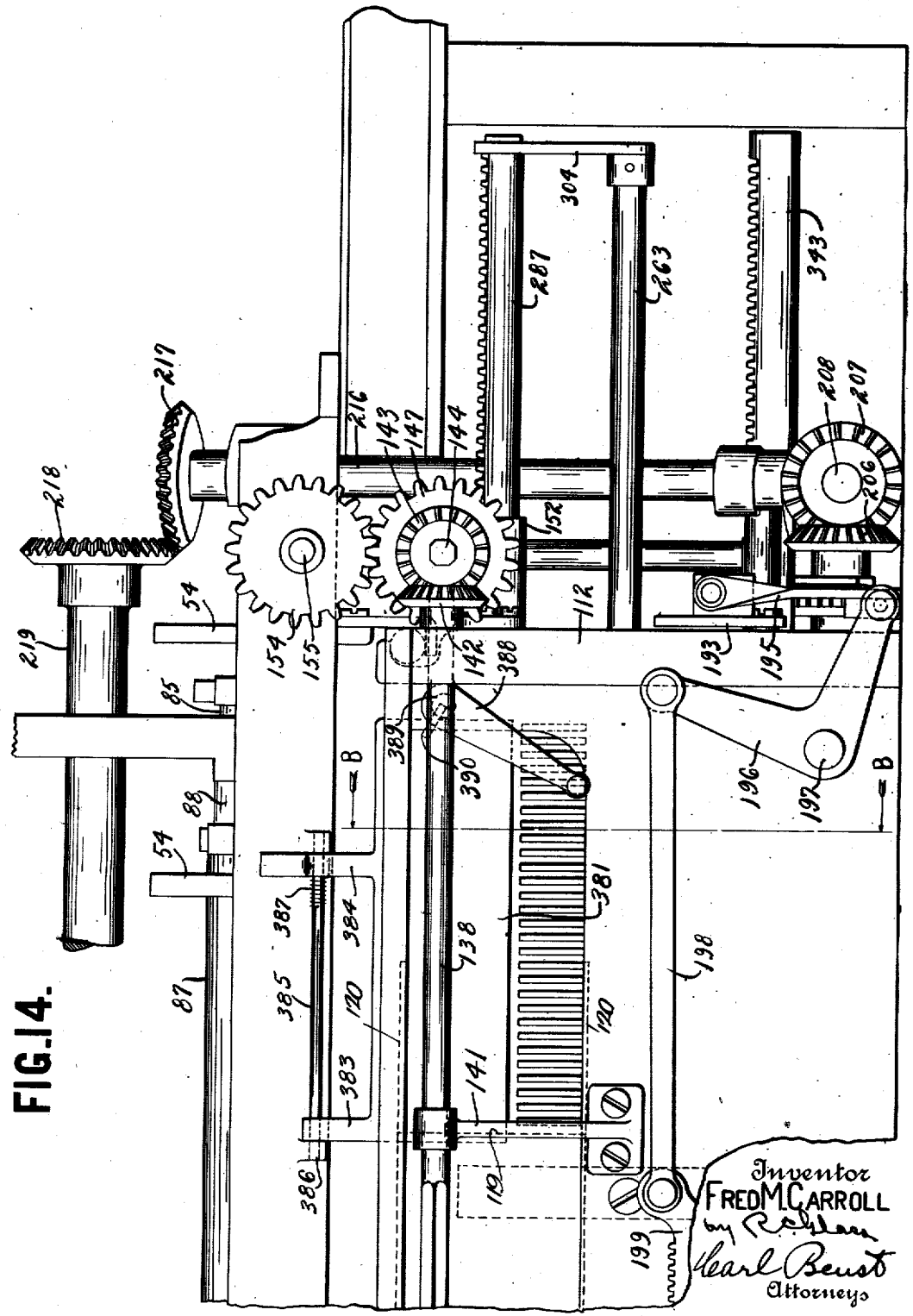

F. M. CARROLL.
PRINTING MECHANISM FOR CASH REGISTERS.
APPLICATION FILED AUG. 13, 1915.
1,338,903.
Patented May 4, 1920.
13 SHEETS—SHEET 7.
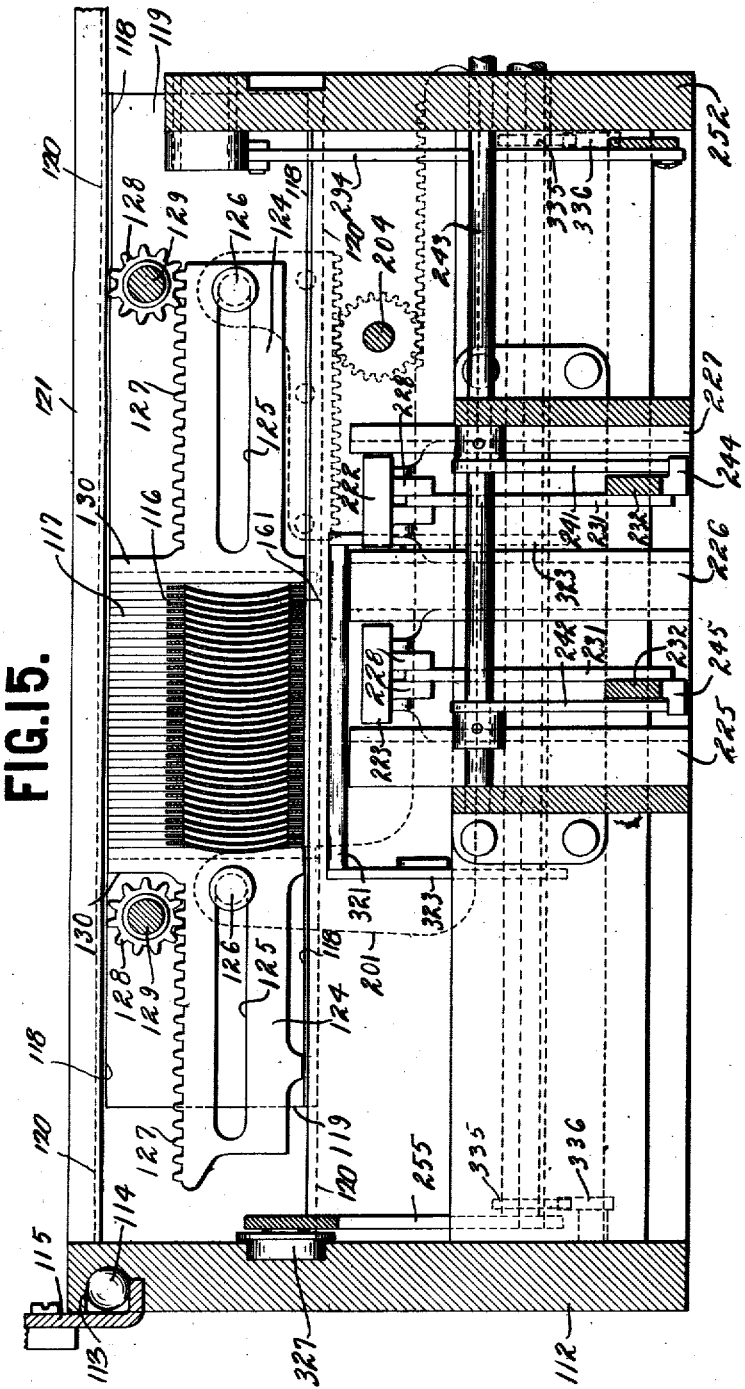
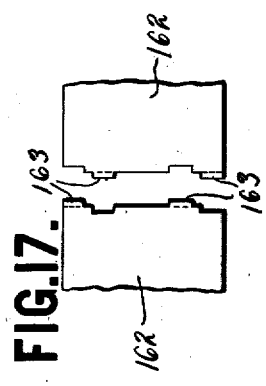
Inventor
FRED M. CARROLL
Attorneys F. M. CARROLL.
PRINTING MECHANISM FOR CASH REGISTERS.
APPLICATION FILED AUG. 13, 1915.

1,338,903.  Patented May 4, 1920.
13 SHEETS—SHEET 8.

Inventor
FRED M. CARROLL
by R. C. Moore
Earl Benst
Attorneys

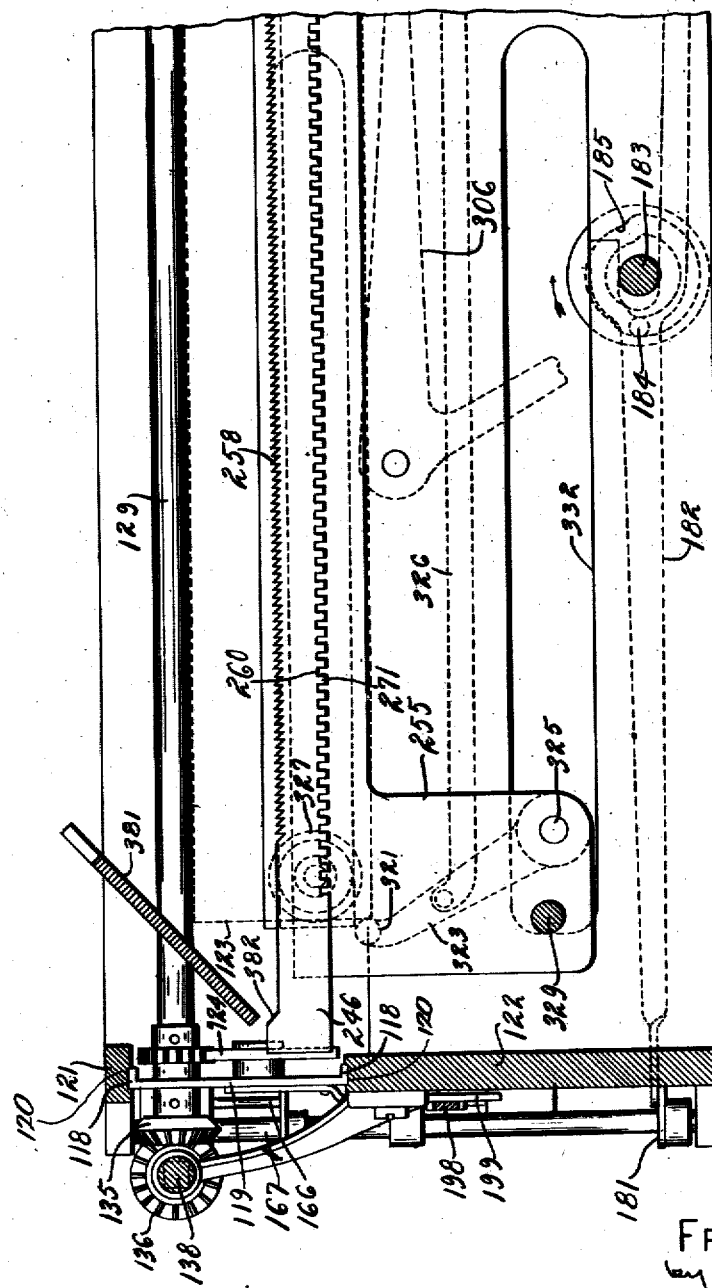

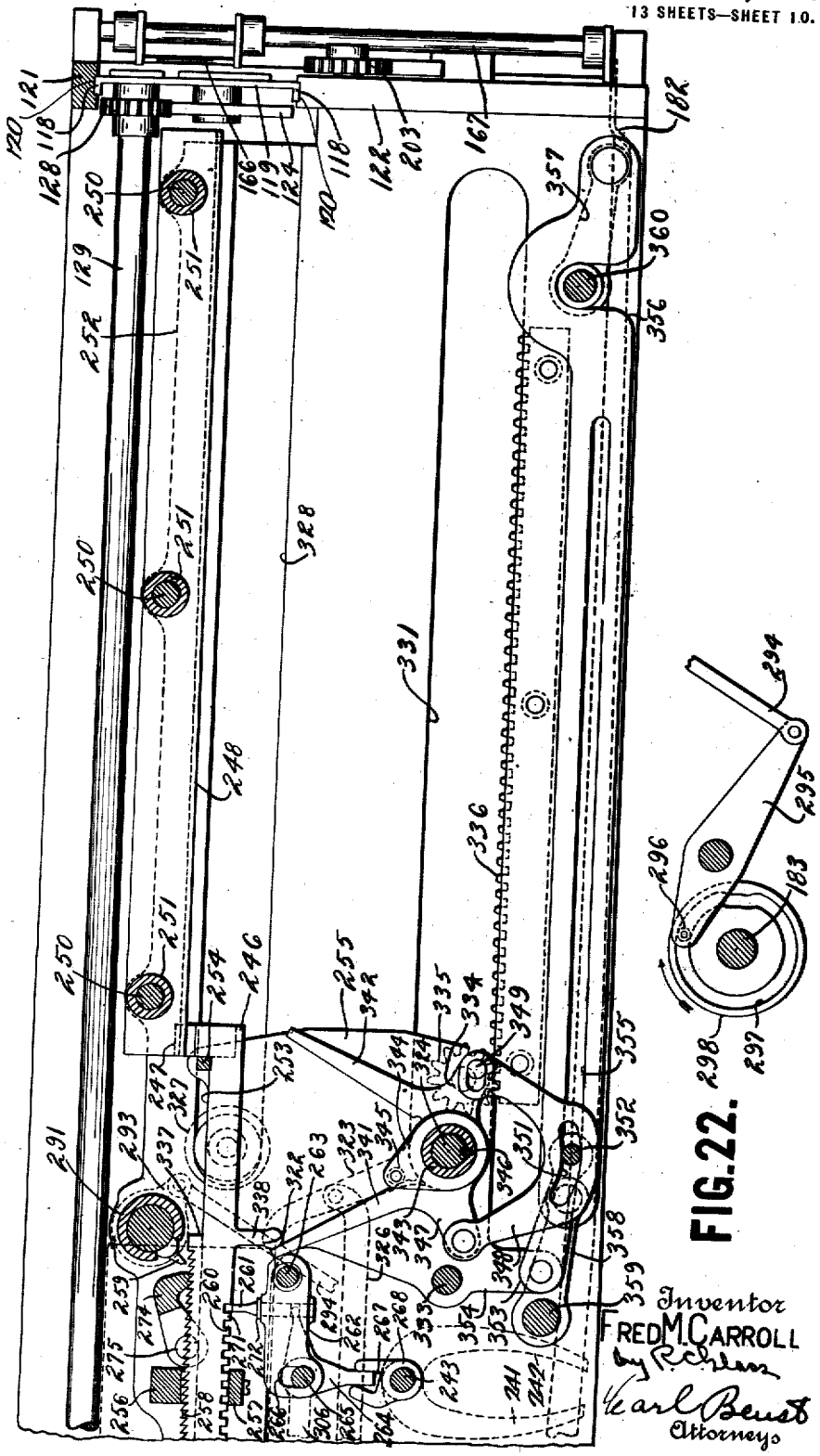

F. M. CARROLL.
PRINTING MECHANISM FOR CASH REGISTERS.
APPLICATION FILED AUG. 13, 1915.
1,338,903. Patented May 4, 1920.
13 SHEETS—SHEET 11.
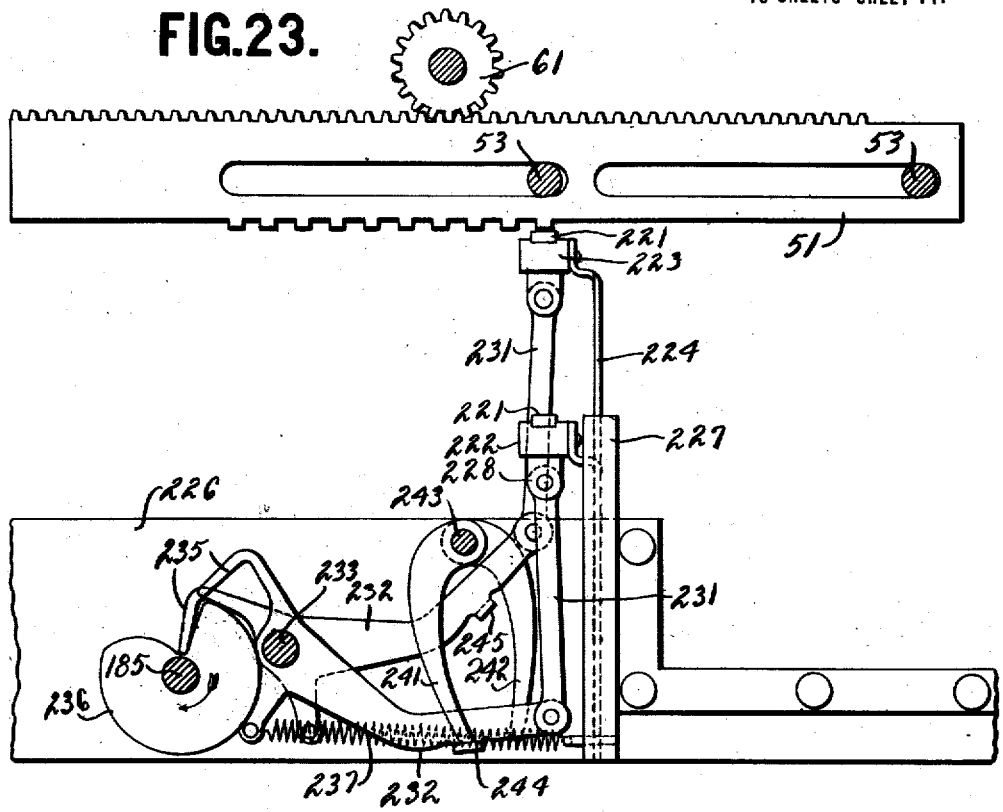
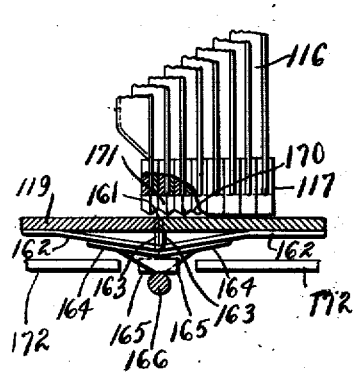
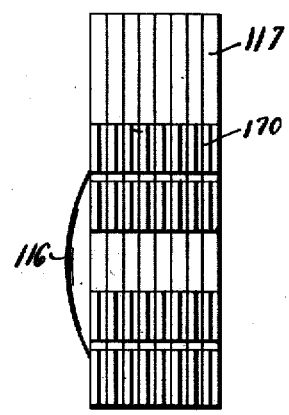
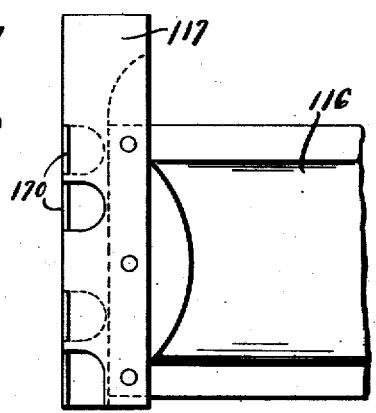

F. M. CARROLL.
PRINTING MECHANISM FOR CASH REGISTERS.
APPLICATION FILED AUG. 13, 1915.

1,338,903.

Patented May 4, 1920.
13 SHEETS—SHEET 12.

Inventor
FRED M CARROLL
Attorneys

F. M. CARROLL.
PRINTING MECHANISM FOR CASH REGISTERS.
APPLICATION FILED AUG. 13, 1915.

1,338,903.

Patented May 4, 1920.
13 SHEETS—SHEET 13.

Inventor
FRED M. CARROLL

UNITED STATES PATENT OFFICE.

FRED M. CARROLL, OF DAYTON, OHIO, ASSIGNOR TO THE NATIONAL CASH REGISTER COMPANY, OF DAYTON, OHIO.

PRINTING MECHANISM FOR CASH-REGISTERS.

1,338,903.  Specification of Letters Patent.  Patented May 4, 1920.

Application filed August 13, 1915. Serial No. 45,300.

*To all whom it may concern:*

Be it known that I, FRED M. CARROLL, a citizen of the United States, residing at Dayton, in the county of Montgomery and State of Ohio, have invented certain new and useful Improvements in Printing Mechanism for Cash-Registers, of which I declare the following to be a full, clear, and exact description.

This invention relates generally to improvements in cash registers and has particular reference to improvements in printing mechanisms for such machines.

One object of the invention is to provide an improved column printing mechanism capable of printing in a larger number of columns than has heretofore been thought practical in cash register construction. In the illustrative embodiment, this improved mechanism is shown arranged to print in twenty-nine columns. As will be clear later on, however, this particular number is not essential, the invention being such that it may readily be constructed to print in either a larger or smaller number of columns if desired while certain of the constructions shown herein are capable of use with mechanisms employed to print in a single column.

Another object of the invention is to print the items in the various columns in such a way that a comparatively small amount of paper may be used. In the embodiment shown this is accomplished by printing the items in each column in two vertical rows, successive printings in the same column alternating between the rows, with the first item in each row appearing at the top of the column and the others following one after the other at regular intervals. Such a construction not only reduces the cost of operation to a minimum because of the saving in paper, but incidentally results in other advantages in the way of compact arrangement of the mechanism and so on, all of which will be apparent after the invention is more fully understood.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings:—

Fig. 3 is a front elevation of the right hand side of the keyboard. It shows the units of cents bank and the two banks of classification or number keys, also some of the controlling mechanism operated by the tens bank of number keys.

Fig. 4 is a right elevation of the tens bank of number keys.

Figs. 5 and 6 are sections taken through the tens number bank showing respectively the ten and twenty number keys and some of the devices associated therewith.

Fig. 7 is a top plan of the type carriers and some of their connections and also shows the planetary gearing forming a part of the mechanism for adjusting the paper carriage from one columnar position to another.

Fig. 8 shows in right elevation the planetary gearing for adjusting the paper carriage, the segments for driving the gearing, and the segments for setting the type carriers.

Fig. 9 is a detail of one of the assembled gear units of the planetary gearing.

Fig. 10 is a reduced assembled view in right elevation of various driving devices and connections comprised by the improvement.

Fig. 11 is a detail of a cam for operating the paper unfolding mechanism.

Fig. 12 is a detail of a cam for operating alining devices for the slides controlling the line spacing mechanism and the printing hammers.

Fig. 13 shows the left hand half and Fig. 14 the right hand half of a front elevation of the mechanism for adjusting the paper carriage and unfolding the paper.

Fig. 15 shows approximately the left hand half and Fig. 16 the right hand half of a section taken on the line A—A of Fig. 10 looking in the direction of the arrows in the latter figure.

Fig. 17 illustrates the construction of two of the parts comprised by the paper unfolding mechanism.

Fig. 20 is a front part and Fig. 21 the rear part of a section taken on the line B—B of Fig. 14.

Fig. 22 is a detail of a cam and part of the connections for actuating the controlling slide operating pawl shown in Fig. 18.

Fig. 23 shows the impression hammers and part of their operating devices, also the stops controlling operation of the hammers. In this figure the driving mechanism has been operated far enough to release one of the hammers.

Fig. 24 illustrates the construction of the paper supporting slides or plates and some of the mechanism for separating the plates to open any desired fold in the paper.

Figs. 25 and 26 show respectively an end view of a few of the paper supporting plates and a partial side view of one of the plates.

Figure 1:
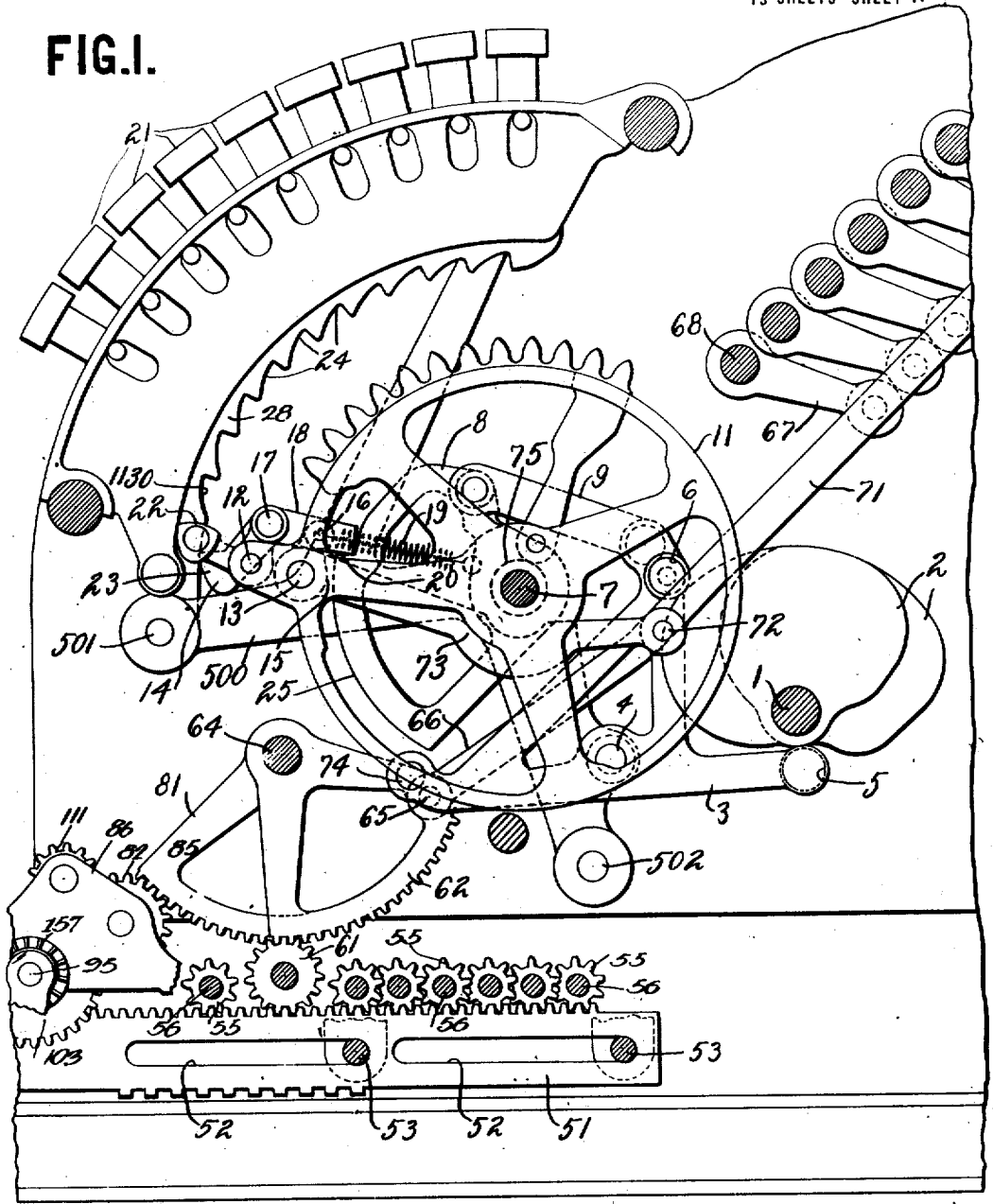
Figure 1 is a partial section taken at the right of one of the value key banks of the improved machine, the planetary gearing controlling column selection being shown in right elevation.

In the accompanying drawings the improvement is shown applied to a cash register of the type fully shown and described in Letters Patent of the United States, No. 1,230,864, issued to William A. Chryst, June 26, 1917. Only those parts which are essential to a clear explanation of the present invention are shown and described herein and it will be necessary to refer to the patent cited if information is desired as to the construction and operation of other features of the register.

The improved machine has a key board containing nine vertical rows of keys. The seven rows at the left are for entering amounts and each controls the usual differential element for actuating the totalizers and controlling the setting of indicators and type carriers. All of the rows of amount keys are not shown in the drawings, but it will be understood they are substantially the same so far as the arrangement and general appearance are concerned. The two rows of keys at the right of the key board are classification or clerks' number keys. The units number row has a full set of nine keys controlling the movement of a differential element in the same way as do the rows of amount keys, while the tens row has, in this instance, but two number keys, a ten and a twenty key occupying the usual positions at the bottom of the bank. The tens row of number keys controls two elements similar to the differential elements controlled by the amount and units number keys. These two elements, as well as the differential elements in the other banks, are normally latched at their zero positions. One of the two elements may be unlatched by depressing the tens number key or both may be unlatched by operating the twenty number key. Neither of the two has a differential movement, however, but if either is unlatched at all it is carried all of the way to the top of the bank. They are arrested at the top of the bank by stops which are projected into their paths when keys in the tens number bank are depressed.

The two rows of number keys control the adjustment of a sliding paper carriage to any one of twenty-nine different columnar positions. The mechanism for adjusting the carriage comprises a train of planetary gears driven under the combined control of the three elements controlled by the two number banks, the construction of the mechanism being such as to produce at one end of the gear train whatever number of steps of movement in either direction is necessary to move the paper carriage from the position at which it was left by the preceding operation directly to the new position. In other words the planetary gearing affords a means for moving the carriage from one position to another according to the successive combined movements of the three elements controlled by the number keys.

The paper carriage is carried in a frame located under the machine proper and arranged to slide in and out like a drawer, with connections to the driving mechanism arranged in such a way that correct operating relationship is maintained between the carriage and the rest of the register regardless of the position of the frame. The carriage is arranged to receive a sheet of paper having a bellows fold for each of the twenty-nine columns, these folds being separated one from the other by slides or plates which move with the paper carriage when the carriage is adjusted from one position to another. After the carriage and slides have been positioned according to the number keys operated, the sides of the carriage are drawn apart and the slides separated between the two holding the fold for the column to be printed in. This separating movement of the slides opens the fold for the column and draws the paper parallel to the type carriers ready to receive the impression.

As already stated the printing in each column is in two vertical rows, successive printings in the same column alternating between the rows. It has also been stated that the first item in each row appears at the top of the column with the other items following at regular intervals. In order to print in this way it is necessary to provide means for moving the paper either up or down so that the printing will fall on the correct line in the selected column, regardless of whether the preceding item was printed higher up or lower down in one of the other columns. It is also necessary to provide means whereby successive printings in the same vertical row in the same column will be prevented. To accomplish the first result there is provided a pair of bails, one contacting either end of the folded sheet of paper, the bails being given a unitary movement in either direction to slide the paper in its carriage whatever distance is necessary to bring the correct line in the column to the printing line of the type carriers. To accomplish the second result two printing hammers are provided, one for printing in each of the vertical rows with a stop which may be set to prevent operation of one hammer or the other. Controlling the direction and extent of movement of the paper adjusting bails and the setting of the hammer stop is a slide for each column which is advanced a step as an incident to each printing in the column. The construction of the slides and the mechanism coöperating therewith is such that regardless of the line printed upon or the hammer operated in any other column the slide for the selected column will determine the movement of the paper up or down to whatever extent may be necessary to cause printing on the correct line in the column and will also cause the hammer stop to prevent operation of the same hammer as printed the last item in the selected column. The result of thus controlling the paper feed and the printing hammers is that substantially all of the space in each of the twenty-nine columns may be used.

Differential mechanism.

The differential mechanism is substantially similar to that shown in the Chryst patent and reference may be had to it for a detailed description of the same. For convenience, however, the mechanism will be briefly described as follows:

The machine may be operated by means of either a handle or a motor, the driving shaft 1 (Fig. 1) being given a complete rotation at each operation. Attached to the shaft 1 are ten pairs of cams 2, two pairs of the tens number bank and a single pair for each of the other banks. Only one pair is shown in the drawings. Coöperating with each pair of cams 2 is an element 3 pivoted at 4 to a sub-frame 500 (supported by rods 7, 501 and 502), and carrying oppositely extending rollers 5 and 6. Each of these rollers rides on the edge of one of the cams 2, the shape and arrangement of each pair of cams being such that at every rotation of the shaft 1 the elements 3 will be rocked first clockwise (Fig. 1) and then counter clockwise. Loosely mounted on a rod 7 extending across the machine are rock frames 8 loosely connected by links 9 to the upper ends of the elements 3 so that when the elements are rocked in the manner just described the frames 8 will be rocked on the rod 7 over an arc of about 90°.

Loosely mounted on the rod 7 is a substantially circular member 11 for each of the ten rock frames 8. Each of these members carries on pivots 12 and 13, respectively, a bell crank 14 and a short link 15, the bell crank and link in turn carrying on pivots 16 and 17 a latch plunger 18 which is at all times drawn toward the rod 7 by a spring 19. In the normal position of the parts the rear end of the plunger is above a shoulder 20 on the rock frame 8, thereby establishing a driving connection between the frame and the member 11 so that the two will move together so long as the plunger is in engagement with the shoulder 20.

When the key 21 is depressed in any of the amount banks or in the units number bank its inner end will project into the path of a block 22 fastened to a forwardly extending arm of the bell crank 14. When this block strikes the end of a depressed key, during the upward movement of the rock frame 8 and member 11, the bell crank 14, will be rocked on its pivot 12 and the latch plunger 18 thrown forward so that a nose 23 formed thereon will engage with one of a series of notches 24 in a plate 28 fastened to the key frame. This forward movement of the latch plunger 18 withdraws its rear end from engagement with the shoulder 20 of the frame 8 and brings the member 11 to a stop while the frame 8 completes its clockwise movement. The plunger 18 is held in engagement with the notch 24 into which it was projected by the concentric periphery 25 of the frame 8. During the return to normal or counter clockwise movement of the frame 8, the shoulder 20 is, of course, finally carried past the rear end of the plunger 18, at which time the spring 19 will draw the plunger back out of engagement with the notch 24 and restore it to its original position above the shoulder 20. During the rest of the counter clockwise movement the frame 8 and member 11 will then move as a unit until they reach their normal positions in which they are shown in the drawings.

It will be seen, therefore, that the extent of movement of the members 11 depends upon the keys operated. This, however, refers only to the amount banks and the units number bank, neither of the two elements 11 controlled by the tens number bank being limited by the keys for differential movement but being movable over the entire distance to the top of the bank where they are arrested by stops or "dummy" keys 26 and 27 (Figs. 3 and 4).

The construction of the tens number bank is shown in Figs. 3, 4, 5, and 6. One of the two members 11 controlled by this bank is mounted in the key frame containing the "ten" key 29, "twenty" key 30, and the "dummy" key 26. The ten and twenty keys are shortened, however, so as not to interfere with the upward movement of the member. The second member 11 and the dummy key 27 for arresting it are mounted in a key frame to the left of the frame containing the ten and twenty keys. The dummy keys 26 and 27 occupy the same positions and perform the same functions as do the keys for registering the nines in other banks, but have no heads and are protected from manipulation by a cap 31 fastened to the outside casing of the machine. The dummy key 26 is drawn into effective position by operation of the number key 29 and both of the dummy keys are operated when the key 30 is depressed. For this purpose a pin 32 in the key 29 coöperates with one end of a lever 33 pivoted at 34 to the side of the key frame of the tens number bank and having a ball and socket connection 35 with one end of a second lever 36. This lever 36 is pivoted at 37 to the key frame and at its upper end has a pivotal connection with the dummy key 26. By tracing the movement through it will be seen that when the ten key is depressed the dummy key 26 will be also moved down to a position where it will arrest one of the two members 11 controlled by the tens number bank. The "twenty" number key 30 has a pin 41 which also operates the levers 33 and 36 to project the dummy key 26 into its effective position. The pin 41 extends through the shank of the "twenty" number key, as shown at 42, so that depression of the "twenty" number key will also operate a pair of levers 43 and 44 (Fig. 3) similar in every essential particular to the levers 33 and 36. The operation of the levers 43 and 44 projects the dummy key 27 into the path of the latch block 22 for the second member 11 controlled by the tens number bank.

Figure 30:
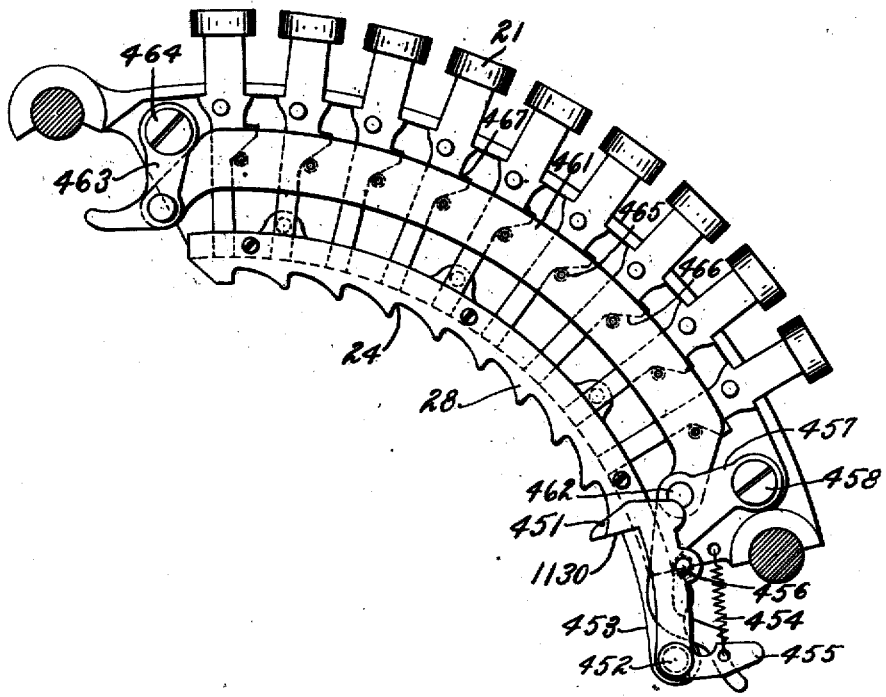
Fig. 30 is a left side view of one of the amount key banks and shows the zero stop mechanism controlled by the keys.

As previously stated in a general way, the differential members 11 for the seven amount banks, the differential member 11 for the units number bank and the two corresponding members controlled by the ten number bank are all normally latched at their zero positions. This result is accomplished by zero stops, one of which, the stop for one of the amount banks, being shown at 451 in Fig. 30. These zero stops are normally held in position to engage the blocks 22 (Fig. 1) and cause the latch plungers 18 to be projected into the lowest or zero notches 1130 in the plates 28 in case no keys are depressed in the associated key banks. When a key is depressed in a bank the stop is swung forward out of the path of the block 22 and the plunger 18 is not operated to disconnect the differential member 11 from the operating frame 8 until the block 22 strikes the inner end of the depressed key.

The zero stops 451 are pivoted at 452 to extensions 453 of the plates 28 in which the notches 24 and 1130 are formed. Springs 454 are at all times under tension and tend to rock the zero stops 451 counter-clockwise (Fig. 30) thereby holding studs 456 on the stops in contact with the forward edges of peculiarly shaped arms 457 pivotally attached at 458 to the key frames. When a key in a bank is depressed the arm 457 is turned counter-clockwise about the pivot 458 thereby turning the zero stop 451 clockwise on its pivot 452 and swinging the upper end of the stop forward out of the path of the tripping block 22 for operating the plunger 18.

The movement just mentioned is imparted to each arm 451 through a plate 461 pivoted at 462 to the arm 457 and loosely supported at its upper end by an arm 463 pivoted on a screw 464 in the key frame. Attached to the side of the plate 461 is a pin 465 for each of the keys 21. These pins coöperate with inclined shoulders 466 on the keys in such a way that when a key is pushed in the plate 461 is moved downwardly and the zero stop 451 rocked forward. When the key has been pressed in practically the entire distance the shoulder 466 will have been carried past the pin 465 and the spring 454 will then raise the plate 461 to seat the pin 465 in the notch 467 in the key and latch the key in depressed position. As the pin moves into the notch the zero pawl 451 will be returned slightly toward its normal position, but not far enough for its nose to be in the path of the block 22. The members 8 and 11 for the key bank will, therefore, move as a unit until the block 22 strikes the inner end of the depressed key. At the end of the operation connections (not shown) lower the plate 461 far enough to disengage the pin 465 thereon from the depressed key, whereupon springs (not shown) return the keys to normal position.

From the foregoing, it might be inferred that the keys 29 and 30 act directly upon plates 461 to operate the corresponding zero stops. In the present instance, however, the zero stops are operated by the dummy keys 26 and 27 both of which are provided with shoulders 466 (Fig. 4) to operate the zero stops for the two tens bank members 11 and the notches above these shoulders 466 serve to retain both the dummy keys and the keys 29 and 30 in depressed position.

As so far described it is clear that one or both of the members 11 for the tens number bank may be released and given the full movement to the top of the bank and back again while the element 11 for the units number bank may be limited differentially for any number of steps up to nine. The purpose of having two members 11 for the tens number bank will be clear later on it being sufficient to state here that each of these two elements is connected to move the paper carriage ten columns, or twenty columns in all if both are operated. That is, they afford a means for moving the carriage extents varying by ten steps. The member 11 for the units number bank, on the contrary, is so connected that it causes movement of the carriage to extents varying by but a single step. By suitable manipulation of the number keys, this mechanism makes it possible to position any one of the twenty-nine columns in correct printing relation to the type carriers and impression hammers.

*Type carriers.*

In this embodiment of the invention the clerks' numbers are not printed, as the column in which an item appears shows as clearly as is necessary which clerk handled the transaction or the class to which the transaction belongs. The amount printing type carriers 51 are, as shown in Figs. 1 and 7, in the form of bars having slots 52 surrounding rods 53 (Fig. 1) in downwardly projecting ears formed on brackets 54 fastened to the machine frames. There are two sets of the type carriers, the sets being exactly alike and so positioned that one will print in the left and the other the right hand vertical row of a column. For this purpose the type carriers of the same denominational order are geared together, as shown in Fig. 7, by gears 55 fastened to shafts 56 journaled in the brackets 54. Meshing with teeth formed on the upper edge of the type bars in one of the sets are gears 61 (Figs. 7 and 8), these gears in turn meshing with the teeth of segments 62 journaled on a rod 64. The segments 62 are moved in such a way that they adjust the type carriers from the positions at which they were left by the preceding operation directly to the desired positions, that is, without a return movement to a normal starting point. To effect this direct movement, each of the segments 62 is connected at 65, Fig. 1, to a link 66 which is connected at its other end to an arm 67 fastened to one of the rock shafts 68. Fastened to each of the shafts 68 is a second arm (not shown) similar to the arm 67 and connected by a link 71 to the rear end 72 of a beam 73, the other end of the beam being journaled on the pivot 13 before mentioned.

After the element 11 has been set at the desired position a roller 74 carried by a forwardly extending portion of the element 3 is, by the clockwise movement of the element, carried against the under side of the beam 73, causing the beam to be carried against a collar 75 surrounding the rod 7. The element 3 is held in engagement with the beam for a short time and then is swung counter clockwise back to its starting position, carrying the roller 74 out of contact with the beam so that when the element 11 is later restored to its normal position the beam will simply turn about its pivot 72. It is clear, therefore, that this mechanism affords a means whereby the shafts 68 may be rocked differential extents directly from one position to another and that, through the connections described, the same movements will be imparted to the segments 62 and type bars 51.

For each of the three members 11 controlled by the number key banks there is provided a segment 81 (Figs. 1 and 8). Intermediate each of the segments 81 and the corresponding member 11 is mechanism for moving the segment directly from one position to another in the same way as just described in connection with the segments 62 for the amount banks.

*Column selecting mechanism.*

The three segments 81 are constantly in engagement with gears 82, 83, and 84 (Fig. 7) the gear last mentioned being fastened to a shaft 85 journaled in the left hand bracket 54 and the right hand one of a pair of brackets 86, the latter brackets being also fastened to the base frame of the machine. The gears 82 and 83 are fastened respectively to tubes 87 and 88 concentric to the shaft 85. The arrangement is such that movements of the gear 82 will be controlled by the element 11 for the units number bank, movement of the gear 83 will be controlled by the element 11 controlled jointly by the 10 and 20 number keys 29 and 30, while the gear 84 will be controlled by the element 11 for the 20 number key. Fastened to the other ends of the tubes 87 and 88 are gears 91 and 92 respectively, while the shaft 85 has attached thereto a gear 93. The gears 91, 92, and 93 drive the planetary gearing hereinbefore mentioned in such a way that the various movements of the segments 81 will be combined to effect rotation of a shaft 95 journaled in the brackets 86 a sufficient number of steps in either direction to adjust the paper carriage directly from the columnar position at which it was left by the preceding operation to the position corresponding to the number key or keys pressed at the beginning of the last operation.

The planetary gearing in question comprises a bevel gear 96 Fig. 7 fastened to the adjacent bracket 86 and a bevel gear 97 fastened to the shaft 95. Intermediate the gears 96 and 97 are three gears 101, 102, and 103, loosely mounted on the shaft 95. Each of these three gears has an opening, as best shown in Fig. 9, in which openings are small bevel gears 104 rotatably mounted on pins 105 set radially in the larger gears, the arrangement being such that the smaller gears are rotatable at right angles to the axes of the larger gears. Between the gears 101 and 102 is a pair of bevel gears 106 and 107, the pair being integral and rotatable about the shaft 95. A similar pair of bevel gears 108 and 109 is loosely mounted between the gears 102 and 103. The gear 104 carried by the gear 101 meshes at one side with the bevel gear 96 fastened to the bracket 86 and at the other side it meshes with the gear 106. The bevel gear 104 carried by the gear 102 meshes at one side with the bevel gear 107 and at the other with the bevel gear 108 while the bevel gear 104 carried by the gear 103 meshes at one side with the gear 109 and at the other side with the bevel gear 97 fastened to the shaft 95. The gears 91 and 93 are directly in mesh with the gears 101 and 103 respectively, but in order to get the proper direction of movement an intermediate gear 111 is interposed between the gears 92 and 102. The gears 92 and 93 are so proportioned with reference to the gears 102 and 103 that the nine steps of movement imparted to the gears 92 and 93 under the control of the members 11 for the tens number bank, which members, it will be remembered, are limited to nine steps of movement by the dummy keys 26 and 27, will produce ten steps of movement of the gears 101 and 102. From the construction described it is apparent that any motion imparted to any one of the gears 101, 102, and 103 will be transmitted through the train of bevel gears to the gear 97 and shaft 95 and that if all three of the gears 101, 102, and 103 are moved simultaneously the shaft 95 will be turned a number of steps equal to the combined movements of the gears regardless of the direction in which the different gears are moved. For example, if the shaft 95 was rotated to its 20 position at one operation under the control of the two members 11 for the tens number bank and at the next operation only the "7" key is pressed in the units number bank, the units gear 101 will be advanced seven steps at the same time that the gears 102 and 103 are each being reversely rotated ten steps, because of the operation of the beams 73 and rollers 74 while the two tens number bank members 11 are being held at zero. The net result of the second operation will be that the shaft 95 will be reversely rotated 13 steps from its 20 to its 7 position. If with the shaft at the 7 position the machine is next operated with the 20 and 5 number keys depressed the units gear 101 will be reversely rotated two steps from its 7 to its 5 position while the gears 102 and 103 are simultaneously advanced ten steps each. The net result of this movement of the three gears will be to turn the shaft 95 forward 18 steps from its 7 position to its 25 position. Other examples might be given, but these are thought to be sufficient to show that the train of gearing is so organized that the shaft 95 may be turned from any one of its 29 positions directly to any other position according to the numbers set up on the number keys at the beginning of the successive operations of the machine. The shaft 95 operates suitable connections whereby the paper carriage may be adjusted to effect printing in any desired one of twenty-nine columns on a record sheet.

The paper carriage, in fact all of the printing mechanism except the type carriers and the planetary gearing just described, is carried in a sliding rectangular frame the side members 112 of which have races 113 (Figs. 15 and 16) containing balls 114 coöperating with rails 115 fastened to the base of the machine. This arrangement permits moving the frame in and out of the machine like a drawer, the object being to permit restoring certain mechanism to a normal starting point and at the same time give access to the paper carriage.

The paper carriage is located in the left hand part of the sliding drawer or frame and comprises thirty-three slides 116 (Figs. 15, 24, 25, 26 and 28). These slides are long enough to extend from the front to the back of the sliding drawer or frame and are made of thin strips of metal formed for the greater part of their length in the manner of shallow troughs. At their ends the slides are provided with plates 117 thick enough to space the slides apart slightly, these plates normally being held in close engagement with each other by means described later, the fact that the slides 116 are spaced apart slightly providing spaces in which the bellows folds in the paper 123 (Fig. 29) are inserted.

The plates 117 rest between parallel horizontal flanges 118 (Figs. 15, 20 and 21) formed on pairs of plates 119 (see also Figs. 13 and 14), one pair across the front and the other across the rear of the sliding drawer or frame. These pairs of plates are slidably mounted in grooves 120 in the cross members 121 and 122 of the sliding drawer or frame. In the normal condition of the parts the pairs of plates 119 are held together with their ends in contact as shown at 161 (Figs. 13, 15 and 24).

Figure 28:
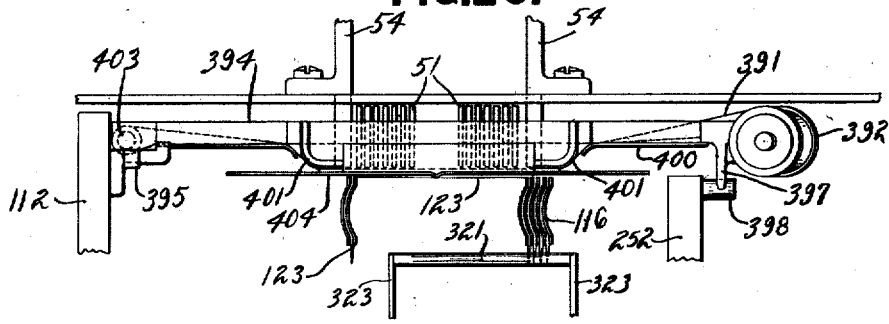
Fig. 28 shows, among other things, the way in which a fold in the paper is opened and drawn parallel to the type carriers when the carriage is opened and the paper supporting slides separated.

As before stated, the paper 123 has a bellows fold for each of the twenty-nine columns. In addition to this the paper may be given an extra fold at each side. When putting the paper in position one fold is inserted between each pair of slides 116 and the extra folds at the sides of the paper are inserted between the outside slides 116 and the next adjacent slides. The manner in which the paper is inserted between the slides is illustrated in Fig. 28. In operating the machine mechanism hereinafter described slides the paper along the slides 116 to position it to receive the printing impression on the proper line. The slides are also moved sidewise between the flanges 118 on the plates 119 to position the line between the pair of slides 116 containing the fold to be printed in opposite the abutting end 161 of the two pairs of plates 119. The slides 116 on either side of the line 161 are then latched to the respective plates 119 as hereinafter explained so as to prevent any relative movement between the plates and slides, and the plates are then moved in opposite directions to draw their normally abutting ends apart. This causes the plates 119 and the slides 116 latched thereto to move as units to separate the slides and the paper fold at the point where this separation occurs will be opened and drawn upward toward the type carriers.

Just at this point it might be well to state that the trough like formation on the paper slides 116 gives the slides a certain amount of stiffness and thereby prevents the bending which might otherwise occur on account of the length of the slides. Said formation also gives a certain amount of frictional resistance to the movement of the paper along the slides and at the same time stiffens the folds in the paper so that when the slides are drawn apart, as above mentioned, to open one fold the other folds will not be partially withdrawn from between their slides.

The mechanism for moving the slides 116 sidewise between the flanges 118 comprises two pairs of rack bearing elements 124 (Figs. 15 and 20) one pair at the forward and the other at the rear end of the slides 116. These elements have slots 125 surrounding studs 126 fastened on the sliding plates 119 and their rack teeth 127 are constantly in engagement with the teeth of pinions 128 fastened to shafts 129 journaled near their ends in the plates 119. The elements 124 are suitably formed at their ends 130 to engage the outside plates 117 at the ends of the slides 116 and normally hold the slides together as best shown in Fig. 15. The parts are, in the figure mentioned, shown in the position they would occupy to print in the first column; that is, the column that would be printed in if the machine was operated with the "1" key depressed in the units number bank is opposite the line 161 between the plates 119; but it is apparent that by simultaneously rotating the shafts 129 in the same direction and to the same extent the elements 124 and slides 116 may be moved as a unit directly from the position shown to any other position desired. This movement is the column selecting movement of the paper carriage and is imparted through suitable connections by the planetary gearing hereinbefore described. During such an adjustment the sliding plates 119 supporting the shafts 129 are held stationary in the positions shown, but after the carriage is positioned the slides 116 are latched to the plates 119, the plates are separated as previously mentioned and hereinafter described in detail, the purpose of the separating movement being to open the selected fold in the record sheet 123. During this separating movement the shafts 129 are held against rotation so that relative movement between the elements 124 and the sliding plates 119 is prevented, the elements 124 cooperating with the devices described later for latching the slides 116 to the plates 119 to prevent any relative movement between the plates and the slides.

The connections to the planetary gearing just mentioned include bevel gears 135 (Fig. 13) fastened to the forward ends of the shafts 129 and meshing with bevel gears 136. The latter gears are rotatably mounted in brackets 137 fastened to the sliding plates 119, the purpose being to hold the gears 135 and 136 in mesh when the sliding plates 119 are subsequently moved to unfold the paper. Extending through the gears 136 is a shaft 138 journaled at its ends in the side plates 112 and at an intermediate point in a bracket 141 fastened to the forward cross member 122. The shaft 138 is squared for a part of its length to cooperate with corresponding holes in the gears 136 the object being to turn the gears 136 when the shaft is rotated but at the same time allow the gears to move along the shaft when the plates 119 are separated. Attached to the right hand end of the shaft 138 is a bevel gear 142 (Fig. 14) meshing with a bevel gear 143 fastened to the forward end of a shaft 144 journaled in brackets 145 and 146 (Fig. 10) fastened to the right hand side plate 112. The shaft 144 is squared for the greater part of its length to cooperate with correspondingly shaped holes in gears 147 and 148 thereby permitting endwise movement of the shaft through the gears when the sliding frame is drawn forward from under the machine but at the same time preventing rotation of the shaft independently of the gears.

The gear 147 is mounted for rotation only in a bracket 149 fastened to the base frame 151 of the machine proper, while the gear 148 is limited to rotative movement because it performs its work through a slot (not shown) cut in the top of a bearing sleeve 152 forming a part of a bracket fastened at 153 to the side plate 112. Meshing with the gear 147 is a gear 154 fastened to a shaft 155 carrying at its other end a bevel gear 156 (Figs. 7 and 8) meshing with a bevel gear 157, fastened to the end of the planetary gear shaft 95. By tracing the movement through the various devices just described it will be seen that when the planetary gear shaft 95 (Fig. 10) is turned, as previously explained, the shafts 155, 144 and 138 (Figs. 13 and 14) and the two shafts 129 (Fig. 15) will be turned, the gearing connecting said shafts being so proportioned that all of the shafts will turn the same angular distance. As the shafts 129 turn, the pinions 128 (Fig. 15) thereon will move the rack bearing elements 124 and the slides 116 held between the elements to position the slides with the column fold to be printed upon opposite the abutting ends 161 of the plates 119. The slides 116 on either side of the line 161 are then latched to the corresponding plates 119, after which the plates are moved apart to unfold the paper at that point. The mechanism for latching the slides 116 to the plates 119 and the connections for drawing the plates 119 apart will next be described.

*Paper unfolding mechanism.*

The mechanism for latching the slides 116 to the plates 119 comprises four plates 162 (Figs. 13, 17 and 24) made of thin spring material. One of these spring plates is fastened to each of the four plates 119. Each of the spring plates 162 is provided with a pair of fingers 163 projecting through notches (not shown) in the abutting ends 161 of the plates 119. The arrangement of the fingers on the spring plates is best illustrated in the diagram (Fig. 17) in which the plates are shown slightly separated so as to show as clearly as possible the manner in which the fingers overlap or extend across to the opposite sides of the line 161. Each of the spring plates has a small bracket 164 fastened thereon, (Figs. 13 and 24) each of the brackets comprising an arm 165. These arms extend in opposite directions over the line 161. Coöperating with the arms 165 are two bails 166 (Figs. 13, 20, and 21) fastened to vertical rock shafts 167. After the paper carriage has been positioned the shafts 167 are rocked, causing the bails 166 to force the fingers 163 of the spring plates 162 into engagement with notches 170 (Figs. 24, 25 and 26) in the ends of the plates 117 attached to the slides 116, thereby latching the slide 116 to the plate 119 and slightly separating the slides 116 between the two containing the paper fold for the column in which the printing is to follow. The plates 119 are then drawn apart by connections described a little farther along to further separate the slides and this opens the column fold in the paper 123 in such a way as to draw the unfolded portion parallel to the type carriers 51 with a half of the column space under each set of carriers as shown in Fig. 28. The arms 164 on the spring plates 162 are so proportioned that at the beginning of the separating movement of the plates the fingers 163 are held in engagement with the notches 170 by the bails 166 until the arms 164 have been carried behind plates 172 fastened as at 173 and 174 to the upper and lower cross members 121 and 122. The plates 172 are arranged to maintain the fingers 163 in engagement with the notches 170 during the rest of the separating movement of the plates 119. After the impression is taken the plates 119 are brought together again and as the arms 164 pass from behind the plates 172 the tension of the spring plates 162 is released and the fingers 163 of the plates 119 are withdrawn from engagement with the notches 170.

As previously stated, during the separating movement of the plates 119 the shaft 138 (Fig. 13) is held stationary and this of course prevents rotation of the shafts 129. As a result, the elements 124 cannot move relative to the plates 119 and the elements 124 will therefore coöperate with the fingers 163 on the latching spring plates 162 to hold the paper slides 116 in vertical position between the plates 118. As plates 119 begin to close the slides 116 the shafts 129 will still be held against rotation so that the elements 124 will bring the separated slides 116 together and again close the column fold which has just been opened.

The mechanism for rocking the shafts 167 to swing the bails 166 into engagement with the arms 165 comprises arms 181 fastened to the shafts in such a way that the one at the front of the machine extends to the right and the one on the rear shaft to the left, that is, the arms 181 extend in opposite directions from their respective shafts. Connecting the arms is an element 182 (Fig. 20) offset at points intermediate its ends to conform to the arrangement of the arms 181 on their shafts 167. This element is suitably formed to slide upon a shaft 183 and carries an anti-friction roller 184 projecting into a cam groove 185 in the side of a disk fastened to the shaft. The shaft 183 extends from right to left the full width of the sliding frame and is given a complete rotation in the direction of the arrow at each operation of the machine. The cam groove 185 is so shaped that the member 183 is drawn rearward at about the time the first half of the operation of the machine is completed. Owing to the arrangement of the arms 181 on their shafts and the fact that the element 182 is suitably shaped to conform to that arrangement this movement of the element 182 rearward will rock the shafts 167 in opposite directions. This will swing the bail 166 at the front of the machine rearward and the bail at the rear of the machine forward, thereby correctly operating both sets of spring plates 162.

The mechanism for drawing the plates 119 apart to separate the slides 116 latched thereto is also operated from the shaft 183. For this purpose the shaft carries a gear 186 (Fig. 10) meshing with a gear cam 187 loosely mounted on a stub shaft 188 attached to the side plate 112. The gears 186 and 187 are so proportioned that the latter makes a half rotation at each complete rotation of the shaft 183. Formed in one side of the gear 187 is a cam groove 191 (Fig. 11) into which projects a stud 192 attached to the side of a lever 193. This lever is pivoted at 194 to the side plate 112 and at its forward end is connected by a twisted link 195 to one arm of a bell crank 196 (Fig. 14) pivoted at 197 to the lower cross member 122. The upwardly extending arm of the bell crank 196 is connected by a link 198 to one end of an element 199 mounted for endwise movement in brackets 200 (Fig. 13) attached to the lower cross member 122. At its other end the element 199 has an upwardly extending portion 201 fastened to the left hand sliding plate 119 by an extension of the same stud 126 as slidably supports the element 124 on the other side of the plate. The upper edge of the element 199 has teeth 202 meshing with a gear 203 fastened to the forward end of a shaft 204 journaled in the forward and back cross members 122. The gear 203 in turn meshes with the teeth of a rack 205 fastened to the right hand sliding plate 119. The cam groove 191 is so shaped that shortly after the first half of the operation of the machine is completed the bell crank 196 will be rocked anti-clockwise about its pivot 197 thereby thrusting the element 199 and its sliding plate 119 to the left (Fig. 13). At the same time the rack teeth 202 on the element 199, will rotate the gear 203 and shaft 204 to move the rack 205 and its sliding plate 119 to the right. This effects the separation of the plates 119 and paper slides 116. The sliding plates 119 at the rear of the machine are provided with an element 199 and a rack 205 similar to the ones at the front except that the rear element 199 is not connected to the driving mechanism, the power for operating the rear plates being transmitted through the shaft 204. Near the end of the operation the bell crank 196 is swung clockwise (Fig. 14) back to its original position thereby restoring the parts connected thereto to their original positions.

The shaft 183 is driven through connections to the main driving mechanism of the machine. For this purpose there is fastened to the shaft a bevel gear 206 (Fig 10) meshing with a bevel gear 207 fastened to the end of a shaft 208 rotatably mounted in brackets 209 and 210, fastened to the right side plate 112. The shaft 208 is squared for the greater part of its length to form a driving connection between the shaft and the bevel gear 212, but at the same time permit endwise movement of the shaft when the sliding frame is drawn forward. The gear 212 is held for rotative movement only in the lower end of a bracket 213 fastened at 214 to the base frame 151. Meshing with the bevel gear 212 is a bevel gear 215 fastened to the lower end of a shaft 216 rotatably supported by the bracket 213 and carrying at its upper end a gear 217. Meshing with the gear 217 is a bevel gear 218 fastened to a short shaft 219 which is journaled in the right hand frame of the machine proper. The shaft 219 is suitably connected by gears to the main driving shaft. This connecting gearing and the right side frame are not shown in the drawings, but the construction will readily be understood.

*Printing hammer controlling mechanism.*

Figure 2:
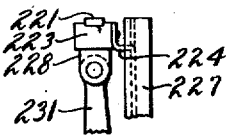
Fig. 2 is a detail of one of the printing hammers and the parts whereby the hammer is guided for vertical movement.

The printing hammers comprise platens 221, Figs. 2, 15, and 23, one for each set of type carriers, mounted in platen carriers 222 and 223. Fastened to the rear sides of the carriers 222 and 223 are plates 224 suitably formed for their edges to coöperate with grooves in the sides of uprights 225, 226, and 227, the arrangement being such that the platen carriers and platens are limited to a vertical movement. Pivoted between pairs of ears 228 formed on the under sides of platen carriers 222 and 223 are the upper ends of links 231. At their lower ends these links are loosely connected to the rear ends of elements 232 pivoted on a rod 233 and having fingers 235 normally held in engagement with the peripheries of cams 236 by springs 237. The cams 236 are fastened to the shaft 185, this shaft it will be remembered making one complete rotation at each operation of the machine. When during an operation the shaft reaches the position shown in Fig. 23, the cut-away portion of the cams will be brought under the fingers 235 so that, if it were not for controlling mechanism provided both hammers would be operated by their springs 237.

Forming a part of the controlling mechanism mentioned is a pair of curved stops 241 and 242 fastened to a rock shaft 243 and arranged to coöperate respectively with laterally extending lugs 244 and 245 carried by the elements 232. The stops 241 and 242 are so positioned with reference to one another on the rock shaft 243 that only one of them will be effective at a time, but by rocking the shaft in the proper direction either may be moved to effective position and the other to ineffective position, that is to say, either of the printing hammers may be prevented from operating depending upon the position of the rock shaft 243.

The shaft 243 is rocked from one position to another by mechanism controlled according to the previous printings in the various columns. This mechanism comprises a plurality of slides 246, one for each of the twenty-nine columns. Attached to the rear ends of the slides are thin plates having lugs 247 engaging flanges projecting laterally from guide plates 248. These guide plates are held in position by rods 250 and are spaced apart by collars or washers 251. At one end the rods are supported in the right hand side plate 112 and at the other end they are supported by the plate 252, Fig. 16, extending from the front to the rear of the sliding frame or drawer. The slides 246 are cut away as at 253, Fig. 21, to receive a cross bar 254 connecting plates 255 forming part of a traveling frame, the bar coöperating with the guides to permit an endwise movement only of the slides. The slides 246 also pass through slots in the lower edge of a bar 256 extending between the right hand side plate and the plates 252, the slides being held in the slots by a strip 257 fast along the under side of the bar.

In the upper edges of the slides 246 are teeth 258. A pawl 259 is moved laterally across the slides by the column selecting mechanism until it is above the slot for the selected column and after the printing in the column is effected the pawl is operated to advance the slide one tooth. The devices for positioning the pawl and then operating it will be described in detail later on. In the lower edge of each slide 246 is a series of square notches 260, there being half as many of these notches as there are teeth 258 on the upper edge of the slide. Coöperating with the lower edges of the slides is a plunger 261 mounted for vertical movement in cross members connecting the side plates of a small yoke 262 fastened to a shaft 263. This shaft is movable endwise only. The plunger 261 has a slot to receive the rearwardly extending arm of a bell crank 264 which is loosely mounted between the side plates of the yoke 262 on a rod 265 extending through short slots 266 in the side of the yoke member. The downwardly extending arm of the bell crank is at all times in engagement with a longitudinal groove 267 (Fig. 21) in the top of an element 268 which is fastened at its ends to the rock shaft 243. At the same time that the pawl 259 is adjusted across the slides 246 to establish operative relationship between the pawl and the desired slide the shaft 263 is moved endwise so as to bring the plunger 261 under the same slide.

In Fig. 21, the stops 241 and 242 are shown in outline at the normal position. In this position the stop 242 is above the lug 245 for the hammer 223 which hammer is to print in the left hand side of the column. The same figure shows the right hand slide 246 at its normal starting point or with the first one of the notches 260 above the end of the plunger 261. It is apparent that if the rod 265 is raised with the parts in the position shown the bell crank 264 and plunger 261 will have a unitary vertical movement. This movement is just sufficient to carry the plunger 261 to the top of the notch. As a result the stops 241 and 242 will not be moved from their normal position, and operation of the left hand hammer 223 will be prevented, but the right hand hammer 222 will be thrown against the type carriers as soon as it is released by its cam 236. The bell crank 264 and plunger 261 are then restored to their original position after which the pawl 259 is operated to advance the slide one tooth, thereby bringing the solid portion 271 above the end of the plunger so that when during the next operation to print in the same column the bell crank 246 is carried up the plunger 261 and the rearwardly extending arm of the bell crank will be held stationary. As a result the bell crank 264 will be caused to rock about the rod 265 and because of the engagement of the downwardly extending arm of the bell crank with the groove 267 in the element 268 the shaft 243 will be rocked anti-clockwise, Figs. 21 and 23. This will move the stop 242 out of the path of the lug 245 for the left hand hammer and position the stop 261 properly to engage the lug 244 for the right hand hammer as shown in Fig. 23. Then when the cams 236 reach the proper point during the second operation the left hand hammer will, of course, be operated to take an impression while the right hand hammer will be latched against movement. When the rod 265 and bell crank 264 are again lowered to their original position, downward movement of the plunger 261 will be prevented by the engagement of an annular flange 272 on the plunger with the top cross member of the yoke 262, thereby causing the bell crank to be rocked back to its original position and swinging the stops 241 and 242 back to the point where the stop 242 will again be in position to prevent operation of the left hand hammer 223. The slide 246 is then advanced a step to bring the second notch 260 above the end of the plunger so that at the third operation to print in the same column the right hand hammer will be operated as first described.

The operation of the slides 246 for the various columns is the same in every respect, that is, they are advanced one tooth as an incident to printing in their respective columns so that the notches 260 and solid portions 271 are alternately brought above the plunger. It will be seen, therefore, that this mechanism provides a means whereby successive operations of the same hammer to print in the same column is automatically prevented. That is to say, because of this controlling mechanism the hammers 222 and 223 are invariably operated alternately with respect to any one column but at the same time the same hammer may be operated a number of times in succession providing the successive printing impressions fall in different columns.

The slides 246 are alined and locked against movement by a frame consisting of a cross bar 274 (Fig. 21) extending across the slides and having its lower edge arranged to engage two notches in each of the slides. The left hand side arm of this frame has a trunnion 275 journaled in the plate 252. The other side arm is fastened to a shaft 276 (Fig. 10) journaled in the right hand side plate 112. Fastened to the outer end of the shaft 276 is an arm 277 pivotally connected to a pitman 278. This pitman, as shown in Fig. 12, is slotted to straddle the driving shaft 183 and has attached to its side an anti-friction roller 281 projecting into a cam groove 282 formed in the side of a disk 283 fast to the shaft 183. The configuration of the cam groove is such that the locking frame 274 is rocked out of engagement with the teeth 258 and held out of engagement during the time that the slide for the column printed in is being advanced by the pawl 252. At all other times the frame is in engagement with the teeth 258 and positively prevents movement of the slides in either direction.

The mechanism for positioning the pawl 259 and plunger 261 in operative relationship with the proper slide is connected to and operated by the column selecting mechanism. The pawl has a slot 284 (Fig. 18) surrounding pins 285 and 286 fastened to the left hand end (Fig. 16) of a shaft 287. This shaft is loosely mounted in the bearing sleeve 152 and has teeth 288 which extend a part of the way around the periphery of the shaft. These teeth are engaged by the gear 148 and the purpose of arranging the teeth on the shaft as just stated is to permit rocking the shaft and at the same time maintain correct engagement between the shaft and the teeth of the gear. The gear 148, it will be recalled, is loose on the square portion of the shaft 144 and does its work through a slot (not shown) cut in the top of the sleeve 152. The shaft and gear are rotated through the connections already described to the planetary gearing. It is apparent that this mechanism affords a means whereby operation of the planetary gearing and connections to shift the paper carriage will also move the shaft 287 endwise to bring the pawl 259 in position to operate the slide for the selected column.

Figure 18:
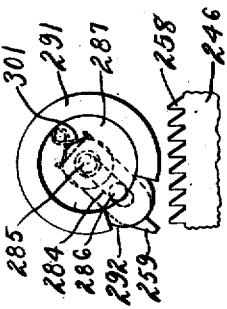
Fig. 18 is a detail of the pawl for operating the slides controlling the spacing mechanism and printing hammers.

Concentric to the shaft 287 and journaled in the plates 112 and 252 is a tube 291. This tube is slotted for the greater part of its length as shown in Fig. 18 and through this slot projects the pawl 259 and a lug 292 on the shaft 287. Fastened to the left hand end of the tube is an arm 293 (Fig. 21) to which is loosely connected the upper end of a link 294 having a pivotal connection at its lower end with a beam 295 pivotally mounted on the plate 256 and having an anti-friction roller 296 projecting into a cam groove 297 in the side of a disk 298 fastened to the shaft 183. The shape of the cam groove is such that toward the end of a rotation or after the slides 246 are released by the locking frame 274 the link 294 will be given an upward thrust thereby rocking the sleeve 291 anti-clockwise (Figs. 18 and 21). This movement, because of the lug 292, rocks the shaft 287 far enough for the pawl 259 to engage the teeth 258 and advance the slide one tooth. After the locking frame 274 has been restored to locking position the tube is rocked back to its original position and during this back to normal movement the pawl 259 is forced back against the tension of a spring 301, this being permitted by the slot and pin connection between the pawl and the end of the shaft. The yoke member 262 is fastened to the inner end of the shaft 263. Fastened to the outer end of the shaft is an arm 304 (Fig. 10) in the upper end of which the shaft 287 is rotatably mounted, the construction being such that the shafts 263 and 287 will have a unitary endwise movement but the shaft 287 will be free to rock. The arrangement is such that this unitary movement of the shafts 263 and 287 will simultaneously bring the pawl 259 and plunger 261 in position to coöperate with the same slide 246.

Figure 19:
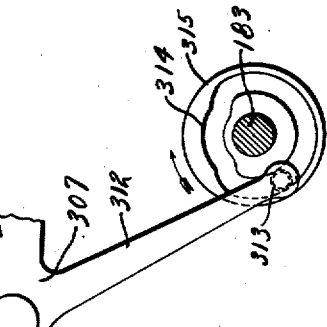
Fig. 19 is a detail of a cam for operating the stops for the printing hammers.

In explaining the operation of the plunger 261 and bell crank 264, it was stated that the rod 265 on which the bell crank is pivoted was raised and then lowered at each operation of the machine. For this purpose the rod is supported at its ends in the rearwardly extending arms 306 of bell cranks 307. One of these bell cranks is pivoted at 308 (Fig. 10) to the side plate 112 while the other is pivoted to the left hand side of the plate 252. Both of these plates are provided with slots, one of them being shown at 311 (Fig. 10) to permit movement of the rod 265. The downwardly extending arms 312 (Fig. 19) of the bell cranks have rollers 313 engaging cam grooves 314 in the sides of disks 315 fastened to the driving shaft 183. The cam grooves are arranged to rock the bell cranks and thereby raise the rod 265 and bell crank 264 as soon as the pawl 259 and plunger 261 have been positioned by the endwise movement of the shafts 287 and 263.

Paper feeding mechanism.

It is, of course, apparent that items will seldom be entered in regular sequence in the column, that is, the first item in column one, the second item in column two and so on. One clerk may enter several transactions before any of the others have occasion to operate the machine. In order to provide for consecutive line spacing in each of the columns it is necessary to move the paper endwise in either direction so as to bring to the printing line the line in the selected column on which the impression should fall when one of the printing hammers is operated. For this purpose two bails are provided, these bails consisting of cross rods 321 and 322 (Figs. 15, 20, and 21) contacting the folded ends of the record sheet at the front and back respectively and side arms 323. The rear pair of side arms is fastened to a rock shaft 324 while the front arms are loosely mounted on a rod 325. Links 326 connect the bails in such a way that when the rear one is swung by the rock shaft 324 the front bail will be moved in the same direction and to the same extent.

The rock shaft 324 and rod 325 are carried by the movable carriage before mentioned. This carriage consists of three of the plates 255. Their relative locations in the machine are best shown in Figs. 15, 16, 20 and 21. Each plate 255 has a pair of rollers 327, the pairs for the right and left plates and the front roller for the intermediate plate operating in grooves cut in the frame members 112 and 252, while the rear roller for the intermediate plate operates in a slot 328 (Fig. 21) in the frame member 252. The three plates 255 are connected by the bar 254 extending through the slot 328 by the rock shaft 324 and a tie rod 329 (Fig. 20). The plate or frame 252 is provided with slots 331 and 332 to permit endwise movement of the carriage. In addition to these connections the right hand plate 255 and the intermediate plate 255 are also fastened together by a tie rod 333 (Fig. 21). In order to offset any tendency there might be for the left hand plate to lag behind the others, a shaft 334 is journaled at its ends in the left hand and intermediate plates 255 and has attached thereto pinions 335 constantly in engagement with racks 336 attached to the frame members 112 and 252.

In the drawings this movable carriage is shown at its extreme forward or starting position. It will remain in this position until a shoulder 337 at the front end of the cut away portion in some one of the twenty-nine slides 246 engages the bar 254. The length of the cut away portions is such that each slide will have 24 steps of movement before its shoulder 337 will contact the bar. After one of the shoulders is once in contact with the bar the carriage will, of course, be moved rearwardly a step each time that particular slide is operated so that if, for example, one clerk was to operate the machine twenty-five times before another clerk started, the second clerk's first item would be printed not on the first printing line but on the second. It is hardly probable, however, that this would occur in the ordinary course of business.

The mechanism for operating the paper adjusting bails to move the paper endwise in either direction is controlled by stops 338 (Figs. 16 and 21) on the under sides of the slides 246 and is so constructed that the rear bail 322 will be brought into alinement with the stop on the slide for the column in which the printing is to fall before the impression is taken. On account of the link connection 326 the front bail will, of course, be moved accordingly. The movement of the paper adjusting bails is effected by a pair of complementarily movable arms 341 and 342. These arms, which are just thick enough to engage one of the stops 338 at a time, are first adjusted by the column selecting mechanism to bring them under the slide 246 for the selected column and are then brought together until they are in engagement, one at either side, with the stop 338 for the column. The complementarily movable arms are mounted on a sleeve 343 in such a way that they are free to oscillate about the sleeve but at the same time when the sleeve is moved endwise by the column selecting mechanism as hereinafter described they are carried along so that after the column is selected the arms will be in position to coöperate with the slide for that column. Fastened to the sleeve 343 is a short arm 344 having a roller 345 projecting between the arms 341 and 342. The sleeve 343 is splined to the rock shaft 324 as shown at 346 (Fig. 21) so that while the sleeve may move endwise on the shaft it cannot turn independently of the shaft. Pivoted to an extension 347 of the arm 341 is one side of a U shaped plate 348, the other side of the plate having a slot and pin connection 349 with the arm 342. The lower part of the plate 348 has a slot 351 through which extends a rod 352 supported at its ends in arms 353 pivoted to downwardly extending portions 354 of the right hand and intermediate plates 255 of the movable carriage. The ends of the rod 352 project through the arms 353 far enough to engage long slots 355 in a pair of plates 356 pivotally supported at their ends by arms 357 and 358 fast to rock shafts 359 and 360.

These shafts are journaled in the intermediate frame plate 252 and the right hand side plate 112 and have fastened at their right hand ends arms 362 and 363 (Fig. 10) connected together by a link 364. Loosely connected to the arm 362 is one end of a pitman 365. The other end of the pitman is slotted to surround the shaft 188 which, it will be remembered, makes half of a rotation at each operation of the machine. Attached to the side of the pitman 365 is a roller 366 engaging a cam groove 367 cut in the side of the gear 187. This cam groove is formed to draw the pitman 365 rearwardly after the complementarily movable arms 341 and 342 have been positioned by the column selecting mechanism. This movement of the pitman causes the shafts 359 and 360 to be rocked anti-clockwise (Figs. 10 and 21) and raises both ends of the plate 356, thereby lifting the U shaped plate 348 to bring the complementarily movable arms together. As they come together the arm 341 will be brought into contact with the stop 338, which will prevent its further movement and the arm 342 will then move the complementary distance until it is also in engagement with the stop. While coming together one arm or the other will engage the roller 345 and rock the shaft 324 to a position corresponding to the position of the stop 338 and this will, of course, operate the paper adjusting bails accordingly. The pitman 365 is then returned to its normal position in time to separate the arms 342 before the feeding pawl 259 is operated.

Figure 16:
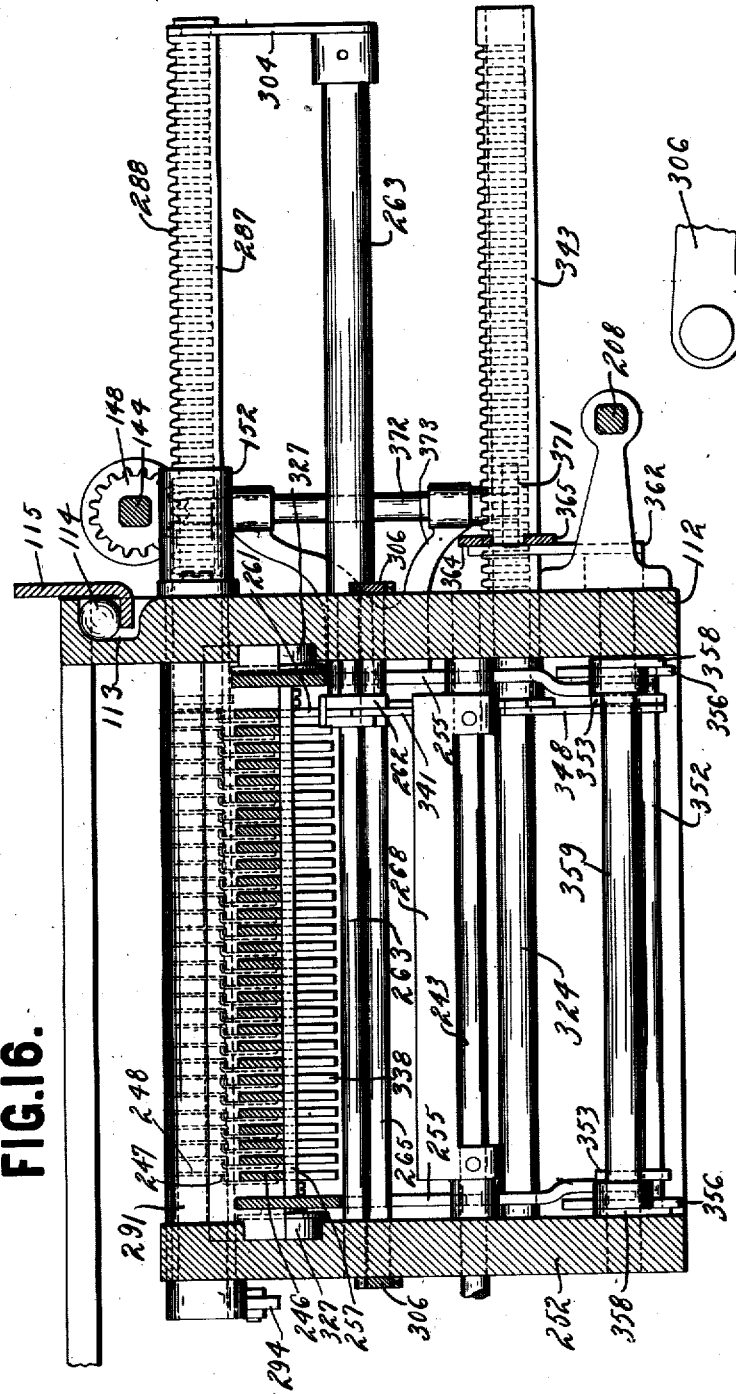

The connections to the column selecting mechanism whereby the sleeve 343 is moved endwise to position the complementarily movable arms 341 and 342 consists of a gear 371 fastened to a short shaft 372 journaled in a bracket 373 secured to the right hand plate 255 of the movable carriage and extending through a slot 370 in the right side frame plate 112. Fastened at the other end of the shaft is a bevel gear 374 meshing with a bevel gear 375 mounted for rotative movement only in an arm 376 formed on the bracket 373. The square shaft 144 passes through a correspondingly shaped hole in the gear 375 so that when the shaft is rotated by the planetary gearing the movement will be transmitted through the connections just described to adjust the sleeve 343 endwise in either direction to bring the complementarily movable arms 341 and 342 in position to coöperate with the proper slide. As shown in Fig. 16 the teeth on the tube 343 extend far enough around the periphery of the tube to prevent any interference by the gear 371 with the rocking movement of the tube.

Figure 29:
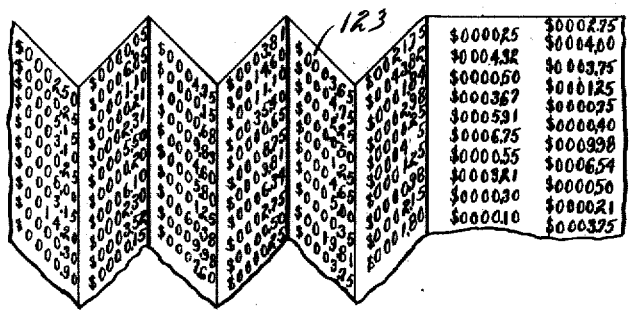
Fig. 29 illustrates the manner in which the items are printed on the record sheet.

The paper feeding mechanism is so constructed that if the machine is operated twice in succession by the same clerk, that is, to print a record of two successive transactions in the same column, the paper will only be moved a half of a line space. This, in connection with the alternate operation of the printing hammers will cause the printing to have a staggered appearance as shown in Fig. 29. This gives compact arrangement of the printing without its being necessary to provide mechanism for disabling the feeding mechanism at alternate printings in the same column as would be necessary if the two successive items were printed on the same line in the column.

When it is desired to start a new record sheet the main sliding frame or drawer is drawn forward as far as it will go and the driving mechanism turned by means of the operating handle just far enough to move the locking frame 274 out of engagement with the teeth on the controlling slides 246. The slides are then drawn forward by hand to their starting positions. This, on account of the engagement of the cut away portions of the slides with the bar 54 will draw the carriage carrying the paper feeding bails 321 and 322 forward and cause the rear bail to slide the paper 123 far enough toward the front to permit its being easily removed. The frame or drawer is then pushed back into the machine, but before it is all of the way in a blade 381 (Figs. 14 and 20) is swung down to bring its edge in the path of shoulders 382 on the slides 246 so that the final movement of the drawer will correctly aline the slides. The blade 381 is then released and moved out of engagement with the shoulders 382 and the operation of the driving mechanism completed so as to reëngage the alining frame 374 with the teeth 258 in the slides.

The blade 381 has a pair of arms 383 and 384 (Fig. 14) pivoted on a rod 385 which is supported at its ends in lugs 386 on the front of the base frame of the register. The arm 384 is suitably formed to engage the base frame and thereby limit upward movement of the blade. Surrounding the rod 385 is a torsion spring 387 connected at one end to the rod and at the other to the alining blade and under sufficient tension normally to hold the stop on the arm 384 against the base frame.

For depressing the alining blade there is provided a handle 388 (Fig. 14) fastened to the forward end of a short shaft 389 rotatably mounted in the front plate of the drawer. At its rear end the shaft has a pin 390 projecting laterally above the upper side of the alining blade 381. It is clear that by turning the handle 388 anti-clockwise (Fig. 14) the blade may be depressed to effective position and that when the handle is released the spring 387 will restore the parts to their normal positions.

Ink ribbon frame.

The ribbon 391 (Figs. 27 and 28) for inking the type is carried by a pair of spools 392 rotatably mounted on studs in arms 393 integral with a frame 394. This frame is set down in the sliding frame or drawer, being provided at one end with a pair of lugs 395 to straddle a block 396 fastened to the left plate 112. At its other end the ribbon frame has a flange 397 which is provided with notches in its lower edge to engage studs 398 on the plate 252. The ribbon passes from one spool 392 over the top of a guide 400, then under a pair of guides 401, then up over the top of a second guide 402 and around a stud 403 in the ribbon frame, and then back through the guides to the other spool 392. The purpose of the guides 400, 401 and 402 is, of course, to carry the ink ribbon down under the type carriers 51.

Figure 27:
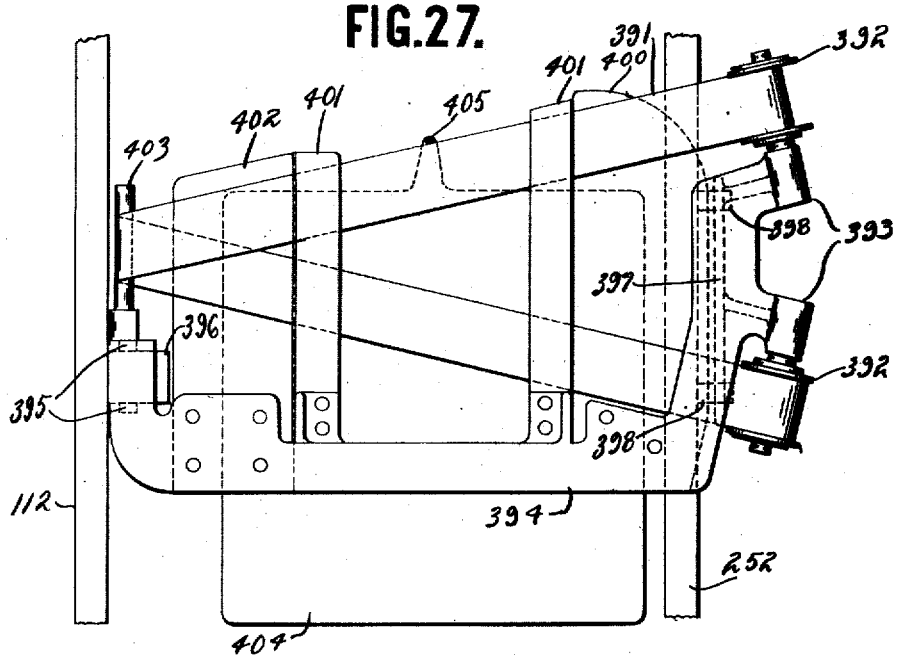
Fig. 27 is a top plan of the ink ribbon and its supporting frame.

Attached to the under side of the ribbon frame is a plate 404 against which the paper is drawn when it is unfolded. Extending rearwardly from the rear edge of the plate 404 is a projection 405 which is bent slightly to form a ridge as best shown in Fig. 27. The purpose of this ridge is to insure proper folding of the strip as the paper slides 116 are brought together after the printing is completed. The printing hammers 222 and 223 strike the under side of the ribbon 391 at either side of the projection 405.

The ribbon feeding and reversing mechanism is not shown or described herein, as it forms no part of the present invention. Any one of several well known devices of the kind may be employed.

While the form of mechanism herein shown and described, is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is:—

1. In a column printing mechanism of the class described, the combination of printing mechanism, manipulative column selecting devices operable singly to effect printing in certain columns and in combinations to effect printing in other columns, and actuating means for the selecting mechanism controlled by the manipulative devices to effect printing in the selected columns.

2. In a column printing machine of the class described, the combination of mechanism for printing in columns upon record material, column selecting mechanism, a plurality of series of keys operable in a plurality of series to effect printing in certain of the columns, and means for actuating the column selector.

3. In a column printing mechanism, the combination of column selecting mechanism, a support for a record sheet, means for printing on the sheet in the selected columns, and a plurality of manipulative devices operable singly for controlling the column selecting mechanism in its selection of certain columns and in combination in its selection of other columns.

4. In a machine of the class described, the combination of a support for a record sheet, of mechanism for printing in any desired column on the sheet, column selecting mechanism, a plurality of keys controlling the selecting mechanism, actuating means for said selecting mechanism, said keys being operatable singly to select certain columns and in combinations to select other columns.

5. In a machine of the class described, the combination with type carriers, of a paper carriage, and means for causing a relative movement between the type carriers and paper carriage whereby to effect column printing, said means comprising a plurality of manipulative devices, actuating means for causing relative movement between the type carriers and paper carriage, said manipulative devices operatable singly or in combinations according to the column to be printed in.

6. In a machine of the class described, the combination with type carriers, of a paper carriage, actuating means for effecting relative movement between the type carriers and paper carriage for column printing, a plurality of manipulative devices operatable either singly or in combinations to control said means.

7. In a machine of the class described, the combination with type carriers, of a paper carriage, means for effecting relative movement between the type carriers and paper carriage whereby to cause column printing, and a plurality of key banks connected to control said means.

8. In a machine of the class described, the combination with type carriers, of a paper carriage, means for causing relative movement between the paper carriage and type carriers whereby to effect column printing, and a plurality of keys operatable singly or in combination and connected to control said means.

9. In a machine of the class described, the combination with type carriers, of a paper carriage, means for effecting relative movement between the type carriers and paper carriage directly and in either direction from one relative position to another, and a plurality of manipulative devices operatable singly or in combinations to control the direction and extent of movement.

10. In a machine of the class described, the combination with type carriers, of a paper carriage, means for effecting relative movement between the type carriers and paper carriage directly and in either direction from one relative position to another, and a plurality of key banks connected to control the direction and extent of the movements effected by said means.

11. In a machine of the class described, the combination with type carriers, of a paper carriage adjustable to different positions with reference to the type carriers to effect column printing, means for adjusting the paper carriage, and manipulative devices operable singly or in combination dependent upon the position to which the carriage is to be adjusted for controlling the carriage adjusting means.

12. In a machine of the class described, the combination with type carriers, of a paper carriage adjustable to different positions with reference to the type carriers whereby to effect column printing, and means for adjusting the paper carriage directly and in either direction from one position to another, said means comprising a plurality of manipulative devices operable singly or in combinations according to the position to which the carriage is to be adjusted.

13. In a machine of the class described, the combination with type carriers, of a paper carriage adjustable to different positions with reference to the type carriers to effect column printing, means for adjusting the paper carriage, and manipulative devices operable singly or in combination to control the means for adjusting the paper carriage.

14. In a machine of the class described, the combination with type carriers, of a paper carriage adjustable with reference to the type carriers whereby to effect column printing, means for adjusting the paper carriage, a plurality of keys operatable singly or in combinations according to the position to which said carriage is to be adjusted.

15. In a machine of the class described, the combination with type carriers, of a paper carriage adjustable to different positions with reference to the type carriers whereby to effect column printing, a plurality of manipulative devices, actuating means for said paper carriage, said manipulative devices controlling said actuating means and requiring the operation of a single manipulative device to effect adjustment of the carriage to certain positions and of a plurality of said devices to effect adjustment of the carriage to certain other positions.

16. In a machine of the class described, the combination with type carriers, of a paper carriage adjustable to different positions with reference to the type carriage whereby to effect column printing, means for adjusting the carriage, a plurality of key banks requiring operation of keys in a plurality of banks to effect adjustment of the paper carriage to certain positions.

17. In a machine of the class described, the combination with type carriers, of a paper carriage adjustable back and forth across the type carriers to effect column printing, devices for adjusting the paper carriage, and a plurality of simultaneously operable manipulative devices for controlling the direction and extent of movement of the carriage.

18. In a machine of the class described, the combination with type carriers, of a paper carriage adjustable back and forth across the type carriers to effect column printing, devices for adjusting the paper carriage, and a plurality of simultaneously operable keys for controlling the direction and extent of movement of the carriage.

19. In a machine of the class described, the combination with devices for printing in columns, of a plurality of manipulative devices, a plurality of actuators controlled by the manipulative devices, and means whereby the combined movement of a plurality of actuators determines the column to be printed in.

20. In a machine of the class described, the combination with devices for printing in columns, of a plurality of key banks, a plurality of actuators controlled by the key banks, and means whereby the combined movement of the plurality of the actuators determines the column to be printed in.

21. In a machine of the class described, the combination with type carriers, of a paper support, a units bank and tens bank of keys, means controlled by the tens bank for causing relative movements between the paper support and type carriers extents varying by ten steps, and means controlled by the units bank for causing relative movements between the support and type carriers extents varying by one step.

22. In a machine of the class described, the combination with type carriers, of a paper support, a units bank and a tens bank of keys, means controlled by the tens bank for causing relative movements between the paper support and type carriers extents varying by ten steps, and means controlled by the units bank for causing relative movements between the type carrier and paper support extents varying by one step, keys being simultaneously operable in each of the banks and the means controlled by the keys simultaneously performing their functions, said means for causing relative movements between the paper support and type carriers set in motion independently of said keys.

23. In a machine of the class described, the combination with type carriers, of a paper carriage adjustable to different positions with respect to the type carriers, a units bank and a tens bank of clerks' number keys, means controlled by the tens bank for moving the paper carriage extents varying by ten steps, and means controlled by the units bank for moving the carriage extents varying by one step, and said paper carriage moving means set in movement independently of said keys.

24. In a machine of the class described, the combination with type carriers, of a paper carriage adjustable to different positions relative to the type carriers, a units bank and a tens bank of keys, the keys in the two banks being operable singly or in any desired combinations, means controlled by the tens bank for moving the paper carriage extents varying by ten steps, and means controlled by the units bank for moving the carriage extents varying by one step, said means set in operation independently of said keys.

25. In a machine of the class described, the combination with type carriers, of a paper carriage adjustable to different positions relative to the type carriers, a units bank and a tens bank of keys, means controlled by the tens bank for moving the paper carriage extents varying by ten steps, and means controlled by the units bank for moving the carriage extents varying by one step, keys in each of the banks being simultaneously operable and the means controlled thereby simultaneously performing their functions, and means for actuating the carriage moving means independently of the actuation of said keys.

26. In a machine of the class described, the combination with type carriers, of a paper carriage adjustable to different positions relative to the type carriers for column printing, a plurality of key controlled actuators, and means for adjusting the paper carriage according to the combined movements of the actuators, and means for adjusting the adjusting means for the paper carriage independently of the actuation of said keys.

27. In a machine of the class described, the combination with type carriers, of a paper carriage adjustable to different positions relative to the type carriers for column printing, a plurality of manipulative devices, a plurality of actuators controlled by the manipulative devices, and means for adjusting the paper carriage according to the combined movements of the actuators, and means for actuating the adjusting means for the paper carriage independently of the actuation of said keys.

28. In a machine of the class described, the combination with type carriers, of a paper carriage adjustable to different positions with respect to the type carriers, a units bank and a tens bank of keys, a plurality of actuators controlled by the tens bank each connected to move the carriage ten steps, and an actuator controlled by the units bank connected to move the carriage from one to nine steps.

29. In a machine of the class described, the combination with type carriers, of a paper carriage adjustable to different positions with respect to the type carriers, a plurality of manipulative devices, a plurality of actuators controlled by the manipulative devices, and planetary gearing driven by the actuators and connected to adjust the paper carriage according to the combined movements of the actuators.

30. In a machine of the class described, the combination with type carriers, of a paper carriage adjustable to different positions with respect to the type carriers, a plurality of key banks, a plurality of actuators controlled by the key banks, and planetary gearing driven by the actuators and connected to adjust the paper carriage directly from one position to another.

31. In a machine of the class described, the combination with type carriers, of a support constructed to receive folded record material, means for unfolding said material and presenting it parallel to the type carriers, and means coöperating with the type carriers for taking impression on the record material.

32. In a machine of the class described, the combination with type carriers, of a support constructed to receive record material having a plurality of folds, means for unfolding said material at any desired point, and means for taking impressions from the type carriers on the unfolded portion of the record material.

33. In a machine of the class described, the combination with type carriers, of a support adjustable relative to the type carriers to different columnar positions and constructed to receive record material having a fold for each column, means for adjusting the support to different columnar positions, and means for unfolding the record material at the positioned column.

34. In a machine of the class described, the combination with printing devices and means for operating same, of a support constructed to receive record material having a plurality of folds, a common means for unfolding the record material, means for establishing operative relationship between the unfolding means and any desired fold of the record material, and means for operating the unfolding means as a preliminary to operation of the printing devices.

35. In a machine of the class described, the combination with type carriers, of a support for record material adjustable relative to the type carriers to different columnar positions and constructed to receive folded record material, means for adjusting the support to different columnar positions, impression devices, and means for unfolding the record material preliminary to operation of the impression devices.

36. In a machine of the class described, the combination with type carriers, of a support for record material adjustable to different positions for column printing and constructed to receive folded record material, means for adjusting the support to different columnar positions, means for unfolding the record material at the positioned column, and means for taking an impression on the record material at the unfolded portion.

37. In a machine of the class described, the combination with type carriers, of a paper carriage adjustable relative to the type carriers to different columnar positions and constructed to receive paper having a bellows fold for each column, means for adjusting the carriage to different columnar positions, means for unfolding the paper at the selected column, and means for taking impressions in said column from the type carriers.

38. In a machine of the class described, the combination with type carriers, of a paper support constructed to receive a folded paper and comprising a plurality of separable plates between which the folds of the paper are inserted, means for separating the plates between any two thereof whereby to unfold the paper at that point, and means for taking impressions from the type carriers on the unfolded portion of the paper.

39. In a machine of the class described, the combination with type carriers, of a paper support constructed to receive a folded paper and comprising a plurality of separable plates between which the folds of the paper are inserted, a common means for separating the plates between any two thereof whereby to unfold the paper at that point, means for establishing operative relationship between the separating means and the desired set of plates, and means for taking impressions from the type carriers on the unfolded portion of the paper.

40. In a machine of the class described, the combination with a paper support arranged to hold paper having a plurality of folds, of means for unfolding the paper at the fold in operative relationship therewith, means for establishing operative relationship between the unfolding means and any desired fold in the paper, and means for operating the unfolding means.

41. In a machine of the class described, the combination with a paper support arranged to receive paper having a plurality of bellows folds, said support comprising a plurality of separable plates between which the folds of the paper are inserted, means for separating the plates between the two plates in operative relationship with the means whereby to unfold the paper at that point, means for establishing operative relationship between the separating means and any desired pair of the plates, and means for operating the separating means.

42. In a machine of the class described, the combination with mechanism for printing in columns on record material whereby to make a classified record of transactions, of line spacing mechanism, and means controlling the spacing mechanism according to the previous printings in the various columns.

43. In a machine of the class described, the combination with mechanism for printing in columns on record material to make a classified record of transactions, of means for adjusting the record material up or down for line spacing, and devices controlling said means according to the previous printings in the respective columns.

44. In a machine of the class described, the combination with column printing mechanism comprising a support constructed to receive paper having a fold for each column, of means for sliding the paper up or down in the support, and devices controlling said means according to previous printings in the various columns.

45. In a machine of the class described, the combination with mechanism for entering records on record material, of means for moving the record material transversely of the entering means to different columnar positions and longitudinally of the columns according to the line to be printed on, manipulative devices controlling the transverse movement, and a device for each column automatically controlling the longitudinal movement.

46. In a machine of the class described, the combination with mechanism for entering records on record material, of means for moving the record material transversely of the entering means to different columnar positions and longitudinally of the columns according to the line to be printed on, manipulative devices controlling the transverse movement, and devices automatically controlling the longitudinal movement according to previous printings in the respective columns.

47. In a machine of the class described, the combination with type carriers, of a paper support movable transversely of the type carriers for column printing, means for moving the support, line spacing mechanism constructed to adjust the paper in either vertical direction, and devices controlling the line spacing mechanism according to previous printings in the column.

48. In a machine of the class described, the combination with mechanism for printing in columns on a record sheet whereby to make a classified record of transactions, of means for adjusting the sheet in either vertical direction for line spacing, a device for each column controlling said means, and means for adjusting the device for a column as an incident to printing in the column.

49. In a machine of the class described, the combination with mechanism for printing in columns on a record sheet whereby to make a classified record of transactions, of a device for each column advanced a step as an incident to printing in the column, and means controlled by said devices for moving the record sheet in either vertical direction for line spacing.

50. In a machine of the class described, the combination with mechanism for printing in columns on record material whereby to make a classified record of transactions, of means for adjusting the record material in either vertical direction according to the line to be printed on in a column, and devices for each column controlling the direction and extent of the vertical movement according to previous printings in the column.

51. In a machine of the class described, the combination with mechanism for printing in columns on a record sheet whereby to make a classified record of transactions, of means for adjusting the sheet in either vertical direction for line spacing, and a device for each column controlling said means to effect printing of the first item in each column at the top of the column and uniform spacing between the succeeding items in the column.

52. In a machine of the class described, the combination with mechanism for entering records on record material, of means for moving the record material transversely of the entering means for column printing and in either vertical direction to cause the first item printed in a column to be printed at the top of the column and the succeeding items to follow at uniform distances apart in the column, manipulative devices controlling the transverse movement, and devices automatically controlling the vertical movement of the record material according to previous printings in the several columns.

53. In a machine of the class described, the combination with mechanism for printing in columns on a record sheet, of an element for each column advanced a step as an incident to printing in the column, a pair of arms controlled for differential complementary movement by said elements, and means operated by said arms for adjusting the paper in either direction lengthwise of the columns to effect consecutive line spacing in each of the columns.

54. In a machine of the class described, the combination with mechanism for printing in columns on a record sheet, of a stop for each column advanced a step as an incident to printing in the column, a pair of members common to the stops and controlled thereby for differential complementary movement, means for establishing operative relationship between said members and the stop for the column to be printed in, and means operated by said arms for adjusting the paper in either direction lengthwise of the columns according to the position of the stop.

55. In a machine of the class described, the combination with column printing mechanism comprising a plurality of printing couples, of line spacing mechanism, and means controlling said mechanism and the printing couples according to the previous printings in the various columns.

56. In a machine of the class described, the combination with column printing mechanism comprising a plurality of printing couples, of line spacing mechanism, and means automatically controlling the spacing mechanism and printing couples according to previous printings in a column.

57. In a machine of the class described, the combination with column printing mechanism comprising a plurality of printing couples, of line spacing mechanism, manipulative devices controlling column selection, and means automatically controlling the line spacing mechanism and the printing couples according to the previous printings in the various columns.

58. In a machine of the class described, the combination with column printing mechanism comprising a plurality of printing couples, and means controlling the printing couples according to the previous printings in the respective columns.

59. In a machine of the class described, the combination with column printing mechanism comprising a plurality of impression devices, and means controlling the impression devices according to the previous printings in the respective columns.

60. In a machine of the class described, the combination with column printing mechanism comprising a plurality of print-couples operable to print in different positions in the selected column, and an independent means for each column automatically controlling operation of the printing couples.

61. In a machine of the class described, the combination with column printing mechanism comprising a plurality of impression devices each to print in a different longitudinal position in the column, and means set as an incident to taking an impression for preventing successive operations of the same impression device to print in the same column.

62. In a machine of the class described, the combination with column printing mechanism comprising one printing couple to print in the left and another to print in the right hand side of any desired column, column selecting mechanism, and means preventing successive printings by the same printing couple in the same column.

63. In a machine of the class described, the combination with an adjustable paper support, of means for adjusting the support to different positions for column printing, two printing couples, one to print in the left and the other in the right hand half of the selected column, and devices for each column controlling the printing couples.

64. In a machine of the class described, the combination with an adjustable paper support, of means for adjusting the support to different positions for column printing, a plurality of printing couples to print at different longitudinal positions in the column, mechanism for moving the paper in either vertical direction for consecutive line spacing in the various columns, and means positioned as an incident to printing in a column for controlling the direction and extent of movement of the spacing mechanism and the operation of the printing couples.

65. In a machine of the class described, the combination with an adjustable paper support, of means for adjusting the support to different positions for column printing, two printing couples, one to print in the left and the other in the right hand half of the selected column, mechanism for moving the paper in either vertical direction to receive an impression a half line lower than the preceding impression in the column, and devices set as an incident to printing in a column for controlling said mechanism and the printing couples at the next operation to print in the same column.

66. In a machine of the class described, the combination with a plurality of tens actuators each controlled to be given an invariable extent of movement when operated and operable singly or in combination as desired, a units actuator controlled for differential movement when operated, an element to be driven by the actuators, and connections for driving said element ten steps for each tens actuator operated and one step for each step of differential movement of the units actuator.

67. In a machine of the class described, the combination with type carriers, of a paper carriage movable to different positions with reference to the type carriers, a plurality of actuators each having an invariable extent of movement when operated and operable singly or in combination, manipulative devices controlling operations of the actuators, and connections for moving the paper carriage extents varying according to the number of actuators operated.

68. In a machine of the class described, the combination with type carriers, of a paper carriage movable to different positions with reference to the type carriers, a plurality of actuators each having an invariable extent of movement when operated, manipulative devices, means controlled by said devices for operating one or more of the actuators depending upon which manipulative device is operated, and means driven by the actuators for moving the paper carriage extents varying according to the number of actuators operated.

69. In a machine of the class described, the combination with type carriers, of a paper carriage to be moved to different positions with reference to the type carriers, a plurality of actuators each constructed to be given an invariable extent of movement when operated, a normally effective zero stop associated with each actuator, a plurality of manipulative devices, connections whereby operation of one manipulative device will disable one of the zero stops and operation of another manipulative device will disable a plurality of the stops, and connections for moving the paper carriage extents varying according to the number of actuators operated.

70. In a machine of the class described, the combination with type carriers, of a paper carriage movable to different positions with reference to the type carriers, a differentially movable units actuator, a plurality of tens actuators each controlled to be given an invariable extent of movement when operated and operable singly or in combination as desired, manipulative devices controlling the actuators, and connections for moving the paper carriage ten steps for each tens actuator operated and one step for each step of differential movement of the units actuator.

71. In a machine of the class described, the combination with mechanism for printing in columns on record material whereby to make a classified record of transactions, of line spacing mechanism, and means for controlling the line spacing mechanism commensurate with the printing whereby said means effects printing on the consecutive lines in the respective columns regardless either of the order in which the columns are printed in or the number of items previously entered in the different columns.

72. In a machine of the class described, the combination with mechanism for printing in columns on record material whereby to make a classified record of transactions, of an adjustable stop for each column of the record material, means for adjusting the stop for the column printed in as an incident to printing, and line spacing mechanism common to all of the columns and controlled by said stops.

73. In a machine of the class described, the combination with mechanism for printing in columns on record material whereby to make a classified record of transactions, of an adjustable stop for each column of the record material, means for adjusting the stop for the column printed in as an incident to printing, line spacing devices common to all of the columns, and a pair of differentially and complementarily movable members controlled by the aforesaid stops for operating the line spacing mechanism.

74. In a machine of the class described, the combination with type carriers, of a paper carriage movable relative to the type carriers by extents each less than the width of a single column whereby to position any desired column at a printing position common to all of the columns, devices for moving the carriage, manipulative means controlling said devices, and means for presenting to the type carriers the full width of the column at the aforesaid printing position.

75. In a machine of the class described, the combination with a support for a record sheet, of mechanism for printing in any desired column on the sheet, column selecting mechanism set in operation independently of said manipulative devices, and said devices being operable singly to select certain columns.

In testimony whereof I affix my signature.

FRED M. CARROLL.